US012758451B2

(12) United States Patent
Söder et al.

(10) Patent No.: US 12,758,451 B2
(45) Date of Patent: Oct. 13, 2026

(54) PATIENT TRANSFER DEVICE WITH A WIRE GUIDE

(71) Applicant: Njord International AB, Gothenburg (SE)

(72) Inventors: Agnes Söder, Gothenburg (SE); Jacob Ahrnstein, Gothenburg (SE); Barbro Cagner, Alingsås (SE); Lars Rydholm, Åtvidaberg (SE); Lisen Vinsa, Linköping (SE)

(73) Assignee: Njord International AB, Gothenburg (SE)

(*) Notice: Subject to any disclaimer, the term of this patent is extended or adjusted under 35 U.S.C. 154(b) by 10 days.

(21) Appl. No.: 18/939,514

(22) Filed: Nov. 6, 2024

(65) Prior Publication Data

US 2025/0235365 A1 Jul. 24, 2025

(30) Foreign Application Priority Data

Jan. 22, 2024 (EP) .................................... 24153270

(51) Int. Cl.
*A61G 7/10* (2006.01)

(52) U.S. Cl.
CPC ........ *A61G 7/1026* (2013.01); *A61G 2200/32* (2013.01); *A61G 2203/40* (2013.01)

(58) Field of Classification Search
CPC .............. A61G 7/1026; A61G 2200/32; A61G 2203/40; A61G 7/1025; A61G 7/1015; F16G 11/14; F16G 11/101; F16G 11/046; F16G 11/00; F16G 11/02; F16G 11/143; F16G 11/04; F16G 11/048; F16G 11/10;
(Continued)

(56) References Cited

U.S. PATENT DOCUMENTS 3,633,646 A * 1/1972 Zilver ..................... E06B 9/305 160/176.1 R
4,529,240 A * 7/1985 Engel ..................... A22B 7/006 452/187

(Continued)

FOREIGN PATENT DOCUMENTS

| | | |
|---|---|---|
| GB | 2436096 | 9/2007 |
| WO | WO2024078750 | 4/2024 |

OTHER PUBLICATIONS

Marleen Kroeders, European Search Report, EP24153270.4, Issued Sep. 3, 2024, EPO, The Hague, Netherlands, Search Performed on Aug. 26, 2024.

*Primary Examiner* — Justin C Mikowski
*Assistant Examiner* — George Samuel Gines
(74) *Attorney, Agent, or Firm* — Silver Legal LLC; Jarrett L. Silver

(57) ABSTRACT

A patient transfer device is used transferring a patient placed on a sheet or mattress from a first surface to a receiving surface. The device can include at least one retractable pulling wire; a pulling arrangement comprising a motor operatively connected to a rotatable wire bobbin so as to allow retraction of the pulling wire by operating the motor and rotating the wire bobbin and thereby winding up the pulling wire around the wire bobbin; and a holder arrangement configured to hold the sheet/mattress when moving the sheet/mattress and thereby transferring the patient placed thereon. The holder arrangement can include a holder element to which the pulling wire is attached.

13 Claims, 17 Drawing Sheets

(58) Field of Classification Search
CPC .... F16G 11/103; F16G 11/106; F16G 11/044; F16G 11/146; F16G 11/06; F16G 11/12
USPC ........................................... 160/178.2; 5/88.1
See application file for complete search history.

(56) References Cited

U.S. PATENT DOCUMENTS

| | | | | |
|---|---|---|---|---|
| 4,887,325 | A | 12/1989 | Tesch | |
| 5,333,333 | A | 8/1994 | Mah | |
| 5,901,388 | A | 5/1999 | Cowan | |
| 9,964,178 | B1 * | 5/2018 | Brewer | B23K 31/02 |
| 2002/0029418 | A1 | 3/2002 | Votel | |
| 2003/0074732 | A1 * | 4/2003 | Hanson | A61G 7/08<br>5/81.1 R |
| 2006/0090258 | A1 * | 5/2006 | Stryker | A61G 7/1026<br>5/81.1 R |
| 2020/0100970 | A1 * | 4/2020 | DiGiovanni | A61G 7/1026 |
| 2020/0337921 | A1 * | 10/2020 | Lindqvist | A61G 7/1015 |
| 2022/0142836 | A1 * | 5/2022 | Kauss | A61G 7/1046 |
| 2022/0273510 | A1 * | 9/2022 | Cagner | A61G 7/1026 |

* cited by examiner

PATIENT TRANSFER DEVICE WITH A WIRE GUIDE

RELATED APPLICATIONS

This application claims priority to European Patent Application No. EP24153270 filed on Jan. 22, 2024. The priority application is incorporated by reference in its entirety.

TECHNICAL FIELD

The present disclosure relates to a patient transfer device for transferring a patient placed on a sheet or a mattress from a first surface to a receiving surface, such as from one bed to an adjoining bed or an operating/examination table.

BACKGROUND

In hospitals, care facilities, and other settings, there is sometimes a need to transfer a patient from one surface to an adjoining surface, such as from one bed to an adjoining bed or to an operating table. This maneuver may be done manually but it is often a heavy job that requires the cooperation of several nurses or other professionals. Various patient transfer devices have been developed to simplify the task.

WO2022/211710 discloses an example of a patient transfer device where a patient placed on a movable sheet can be transferred from a first surface to a receiving surface. The device comprises a pair of laterally spaced apart retractable pulling wires that are retracted and wind up onto a wire bobbin when operating a motor of the device. Outer ends of the wires are connected to the sheet by means of a holder arrangement. The patient is thus transferred by operating the motor after having connected the pulling wires to the sheet.

Although the device of WO2022/211710 may work fine in many situations, there is a need for improvements, for instance with regard to durability, safety, cleaning of the device and the arrangement for holding the sheet.

SUMMARY

The invention concerns a patient transfer device for transferring a patient placed on a sheet or mattress from a first surface to a receiving surface, wherein the patient transfer device comprises: at least one retractable pulling wire; a pulling arrangement comprising a motor operatively connected to a rotatable wire bobbin so as to allow retraction of the pulling wire by operating the motor and rotating the wire bobbin and thereby winding up the pulling wire around the wire bobbin; and a holder arrangement configured to hold the sheet/mattress when moving the sheet/mattress and thereby transferring the patient placed thereon; wherein the holder arrangement comprises a holder element to which the pulling wire is attached.

The pulling arrangement is configured to retract the pulling wire and thus move the holder arrangement and the holder element towards the pulling arrangement so as to, when the holder arrangement is arranged to hold the sheet/mattress, move the sheet/mattress towards the pulling arrangement and thereby transfer the patient placed on the sheet/mattress from the first surface to the receiving surface.

Further, the patient transfer device comprises a wire guide configured to guide the pulling wire towards the wire bobbin when the pulling wire is retracted, wherein the wire guide is arranged to define a wire path having a path entrance facing the holder arrangement and a path exit facing the wire bobbin, wherein the wire path comprises a widening portion at the path exit, wherein the widening portion comprises an increasing width and/or height of the wire path in a direction along the wire path and towards the path exit so as to allow the pulling wire to be directed in different angles corresponding to different positions of a longitudinal axis of the wire bobbin while avoid rubbing the pulling wire against a sharp edge at the path exit when the pulling wire is retracted and wind up around the wire bobbin.

When transferring a patient and thus pulling the wire, there will be a significant tension in the pulling wire since a significant force is required for moving the patient. Even if the device is provided with two pulling wires, there will be a significant tension in each wire. A properly arranged wire guide is important for controlling the position of the wire and avoiding that the wire gets stuck or is exposed to unnecessary wear and tear, all of which are linked to durability and safety aspects of the device.

To reduce friction of the wire, it is important that the wire does not rub against any edge that might damage the wire during operation of the device. A particular challenge in this regard is that the position of the wire at the bobbin will vary along the longitudinal axis of the bobbin because the wire will wind up around the bobbin at a varying longitudinal position thereof, where the longitudinal position typically varies between opposite longitudinal end positions of the bobbin.

To reduce friction of the wire at the exit of the wire path, the wire path comprises a widening portion at the path exit where a width and/or height of the wire path increases in a direction along the wire path and towards the path exit so as to direct the wire in different angles. Thereby the wire will not rub against any edge of the wire guide at the path exit when the wire winds up at different positions of the bobbin. An imagined extension of the wire path may be directed to a longitudinal center point of the bobbin to reduce the maximum wire angle between the wire guide and the end positions of the bobbin.

The wire guide of this disclosure is intended to be stationary as a whole in relation to the wire bobbin as a whole. Although it might be possible in principle to use a wire guide that is moveable in a sideways direction to further reduce friction, it is believed that a stationary wire guide is less complex and makes the device less costly, and can still prevent unreasonably significant wire friction if provided with a widening portion at the wire path exit.

The pulling wire is preferably a line or rope-like element made from a synthetic material such as polyester and/or dyneema. The pulling wire has typically a substantially circular cross section.

The width and/or height of the wire path preferably increases in a continuous manner along the widening portion, i.e. a distance between surfaces defining the wire path may increase continuously along the widening portion. These surfaces may be smoothly curved. A length of the widening portion in the direction along the wire path may be at least approximately equal to a diameter, or at least twice the diameter, of the pulling wire. For a pulling wire having a circular cross section with a diameter of 3 mm, the length of the widening portion may be, for instance, at least 2 mm, or at least 3 mm, or at least 5 mm.

The width and/or height of the widening portion at the path exit may be adapted to the length of the longitudinal axis of the bobbin, or rather to the length of the portion of the longitudinal axis used for winding up the pulling wire, and the distance between the wire path exit and the bobbin, since these measures affect the angle interval within which the wire is to be directed while being wind up. As an example, the distance between the wire path exit and the bobbin may be 5-15 cm and the longitudinal axis of the bobbin may be around 7 cm. In such a case the width and/or height of the widening portion at the path exit may be at least 5-10 mm for a pulling wire having a circular cross section with a diameter of 3 mm.

In an embodiment, the longitudinal axis of the wire bobbin extends in a substantially horizontal direction and in a direction substantially perpendicular to a general direction of the wire path, wherein the widening portion at the path exit comprises an increasing width of the wire path in a direction along the wire path and towards the path exit. Although the longitudinal axis of the wire bobbin may extend in, for instance, a substantially vertical direction, it is an advantage if it extends in a substantially horizontal direction so that a common motor or shaft easily can drive also a second wire bobbin (for pulling a second wire) positioned in the same way and located on the same horizontal level but at some distance to the side.

In an embodiment, the wire bobbin is located at a lower level than the path exit, and wherein the wire path comprises a downwardly directed, preferably curved, portion at the path exit so as to allow the pulling wire to be directed at an angle downwards towards the wire bobbin while avoid rubbing the pulling wire against a horizontally directed edge at the path exit when the pulling wire is retracted and wind up around the wire bobbin. Locating the wire bobbin at a lower level than the wire path exit, which typically is adapted to the height of the surface the patient is placed on so that the pulling wire extends horizontally between the holder arrangement and the wire guide when operating the device and moving the patient, has an advantage in that it makes the device more stable, for instance because the weight of the bobbin(s) and the motor is located at a lower level. The bend downwards for the pulling wire can be handled by the downwardly directed, preferably curved, portion at the wire guide's path exit. As an example, the wire bobbin may be located 4-10 cm below the wire path exit.

In an embodiment, the wire guide comprises a wheel arranged at the path exit, wherein the wheel is provided with a wire guiding recess that extends circumferentially at an outer side of the wheel and forms part of the wire path, and wherein a width of the wire guiding recess increases with an increasing distance from a center point of the wheel.

In case the wire guide is provided with a wheel at the wire path exit, the wheel may form both the widening portion, by means of the increasing width of the wire guiding recess at the side of the wheel facing the bobbin, as well as the downwardly directed portion, by means of the circular outer side of the wheel that directs the wire downwards towards the bobbin.

In case the wire guide is not provided with a wheel, the widening portion may be formed at the path exit in an element that defines the wire path. Also the downwardly directed portion may be formed in that element at the path exit.

In an embodiment, the wire guide comprises a cylindrical element surrounding the wire path along a longitudinal direction thereof. A bottom of the cylindrical element, preferably a U-shaped bottom, may define at least a portion of the wire path.

In an embodiment, the cylindrical element is open at the path entrance towards the holder element and has a funnel-shaped entrance part adapted to a corresponding cone-shaped end part of the holder element so as to receive and enclose the coned-shaped end part of the holder element when the pulling wire is fully retracted. This defines the end position of the holder element, which for instance is useful for automatically detecting whether the end position has been reached.

In an embodiment, the cylindrical element has an elongated opening that extends along the entire cylindrical element so as to allow removal and replacement of the pulling wire from/to the cylindrical element without having to pass an end of the pulling wire through the cylindrical element.

In an embodiment, the elongated opening comprises a plurality of sections that extend in different directions. This reduces the risk for unintentional removal of the wire.

In an embodiment, the wire guide is arranged on a casing of the pulling arrangement. The wire guide may be fixed to the casing by means of screws.

In an embodiment, the pulling arrangement is provided with a proximity sensor configured to detect whether the holder element has reached an end position at or close to the pulling arrangement.

A signal from such a sensor/detector is useful for indicating that the patient transfer is completed and that the motor should be turned off to avoid damage to the patient transfer device when the pulling wire has been fully retracted. For instance, the motor may be damaged if it still is in operation and a part of the holder arrangement gets stuck at or in the pulling arrangement. The proximity sensor simplifies operation of the patient transfer device and reduces the risk for damage to the device. The sensor signal may be used to generate an alarm signal to call a user's attention to the situation and/or to generate a control signal that stops operation of the motor.

The proximity sensor may be based on various non-touch techniques where changes or presence of an electromagnetic field or electromagnetic radiation are sensed.

Typically, the patient transfer device comprises two laterally spaced apart pulling wires arranged in parallel where both pulling wires may be retracted by the same motor (e.g. via first and second bobbins, one for each wire). In such a case the patient transfer device may be provided with first and second proximity sensors, one for each wire/holder element. It may then be arranged so that it is sufficient that one of the proximity sensors detects that the corresponding holder element has reached the end position to generate the alarm and/or control signal.

In an embodiment, the patient transfer device is provided with a control circuitry configured to control operation of the motor in dependence of a sensor signal received from the proximity sensor, wherein the control circuitry is configured to stop operation of the motor when receiving a sensor signal that indicates that the holder element has reached the end position. The control circuitry may comprise a plurality of connected control units, sensors, etc. and is typically configured to control also other parts of the patient transfer device as well as to handle control signals generated by a user.

In an embodiment, the proximity sensor is configured to sense presence or changes in an electromagnetic field or a beam of electromagnetic radiation. The holder element may e.g. be provided with a magnet or a piece of iron that can be detected when coming close to the sensor. Or the change in backscattering from a light source can be used to detect the holder element when located close to the sensor.

In an embodiment, the proximity sensor is configured to sense presence or changes in a magnetic field, such as a Hall effect sensor, and wherein the holder element is provided with a magnet.

In an embodiment, the proximity sensor is arranged in connection to the wire guide.

In an embodiment, the proximity sensor protrudes through a hole in a casing of the pulling arrangement so as to be positioned at least partly above an upper surface of the casing. This way the sensor can come in close contact with the holder element when the wire is pulled in and the holder element approaches the sensor.

In an embodiment, the wire guide is arranged on top of and around the proximity sensor, wherein the wire guide on its lower side is provided with a recess configured to give room for and house the protruding part of the proximity sensor.

In an embodiment, the holder arrangement comprises a stop arrangement configured to hold the first end of the pulling wire in place with respect to the holder element, and wherein the holder element encapsulates the stop arrangement. The stop arrangement may, for instance, be a ferrule clamped to the pulling wire. To prevent that the holder element gets stuck in the sheet or other part when it moves over the surface during retraction of the pulling wire it is an advantage if the holder element has a rounded shape, a smooth surface and that there are no parts protruding therefrom, such as the stop arrangement. Therefore, it is an advantage that the stop arrangement is arranged inside the holder element, i.e. that the holder element encapsulates the stop arrangement. The encapsulation also protects the stop arrangement from dirt and therefore makes the holder arrangement easy to clean.

In an embodiment, the holder element is provided with first, second and third apertures, wherein the stop arrangement is arranged inside the holder element at the first aperture, wherein the pulling wire extends out from the holder element via the first aperture and back into the holder element via the second aperture so as to form a loop outside of the holder element between the first and second apertures, wherein the pulling wire extends out from the holder element via the third aperture and further towards the pulling arrangement, and wherein the pulling wire is free to move in relation to the holder element between the second and third apertures so that the loop of the wire is tightened or decreased when pulling the pulling wire out from the third aperture and so that the loop of the pulling wire is loosened or increased when pulling the pulling wire out from the second aperture.

The wire loop may thus form part of the holder arrangement (together with the holder element and other parts) and may be used for connection to a knob, snap hook or similar for holding the sheet or mattress.

In an embodiment, the holder element comprises a first and a second portion, wherein the first and second apertures are arranged in the first portion, wherein the third aperture is arranged in the second portion, and wherein the first portion is arranged to interconnect with the second portion so that the first and/or the second portion encapsulate the stop arrangement when connected. The use of two (or more) portions allows for arranging the pulling wire and the stop arrangement properly in the holder element before interconnecting the portions.

In an embodiment, the first and second portions of the holder element are arranged so that a part of one of the portions is inserted into the other portion when the first and second portions are pushed together and connected so as to form the holder element, and wherein the first and second portions are provided with a pair of complementary and circumferentially extending snap-lock members that engage when the first and second portions are pushed together and connected. For instance, a part of the second portion to be inserted into the first portion may be provided with an outer flange and a part of the first portion intended to receive the part of the second portion may be provided with an inner complementary groove adapted to receive the flange when the two portions are pressed together.

In an embodiment, the complementary and circumferentially extending snap-lock members comprises a flange and a groove, wherein the flange has an inclined side directed so as to facilitate passage of the snap-lock members when pushing the first and second portions together, and wherein the flange has a straight side directed in the opposite direction so as to prevent unintentional passage of the snap-lock members when the first and second portions have been pushed together and connected.

In an embodiment, the stop arrangement comprises a knot formed by the pulling wire and/or a stop member attached to the pulling wire.

In an embodiment, the stop arrangement comprises a ferrule arranged around the pulling wire, wherein the ferrule is clamped onto the pulling wire so as to be firmly attached thereto, and wherein the ferrule, at least over a part of its length, has a diameter that is larger than that of the first aperture. The ferrule, and the end of the wire, is thus secured inside the holder element. To provide for a secure clamping of the ferrule, the pulling wire may be bent 180° close to its end so that the ferrule is arranged and clamped around a "double" wire.

In an embodiment, the holder element is provided with a wire guiding channel through which the pulling wire runs, wherein the wire guiding channel extends between the second and third apertures, and wherein a part of the wire guiding channel is formed by a guiding tube that is connected to the first portion and extends towards the second portion. The wire guiding channel eliminates or reduces the risk that the pulling wire gets stuck inside the holder element.

In an embodiment, the holder element comprises a magnet. This makes it possible to use e.g. a Hall effect sensor as proximity sensor.

In an embodiment, the magnet is provided with a through hole through which the pulling wire runs. The magnet is preferably arranged inside the holder element so that the through hole forms part of the wire guiding channel. Using such a magnet and arranging the wire in such a way means the magnet surrounds the pulling wire, which in turn means that even if the pulling wire and the holder element is rotated (along the longitudinal direction of the wire), some part of the magnet will always be positioned on a side facing the proximity sensor when the holder element reaches the sensor during retraction of the wire. In turn this ensures that the magnet will not be located too far from the sensor, which may lead to a too weak sensor signal.

In an embodiment, the magnet is arranged at an inside of the second portion facing the first portion of the holder element, wherein the guiding tube is adapted to hold the magnet in place when the first and second portions are interconnected. The magnet may be placed in a recess adapted to receive the magnet. The wire guiding tube then holds the magnet in place when the two portions of the holder element are connected. In this case the wire guiding tube has dual purposes: to guide the wire and to hold the magnet in place.

In an embodiment, the holder element is made of a polymer material, such as a plastic or rubber material.

Each of the holder arrangement and the proximity sensor of this disclosure is useful also in case the patient transfer device is not provided with any wire guide of the above type.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

With reference to the appended drawings, below follows a more detailed description of embodiments of the present disclosure cited as examples. In the drawings.

DETAILED DESCRIPTION

Figure 1:
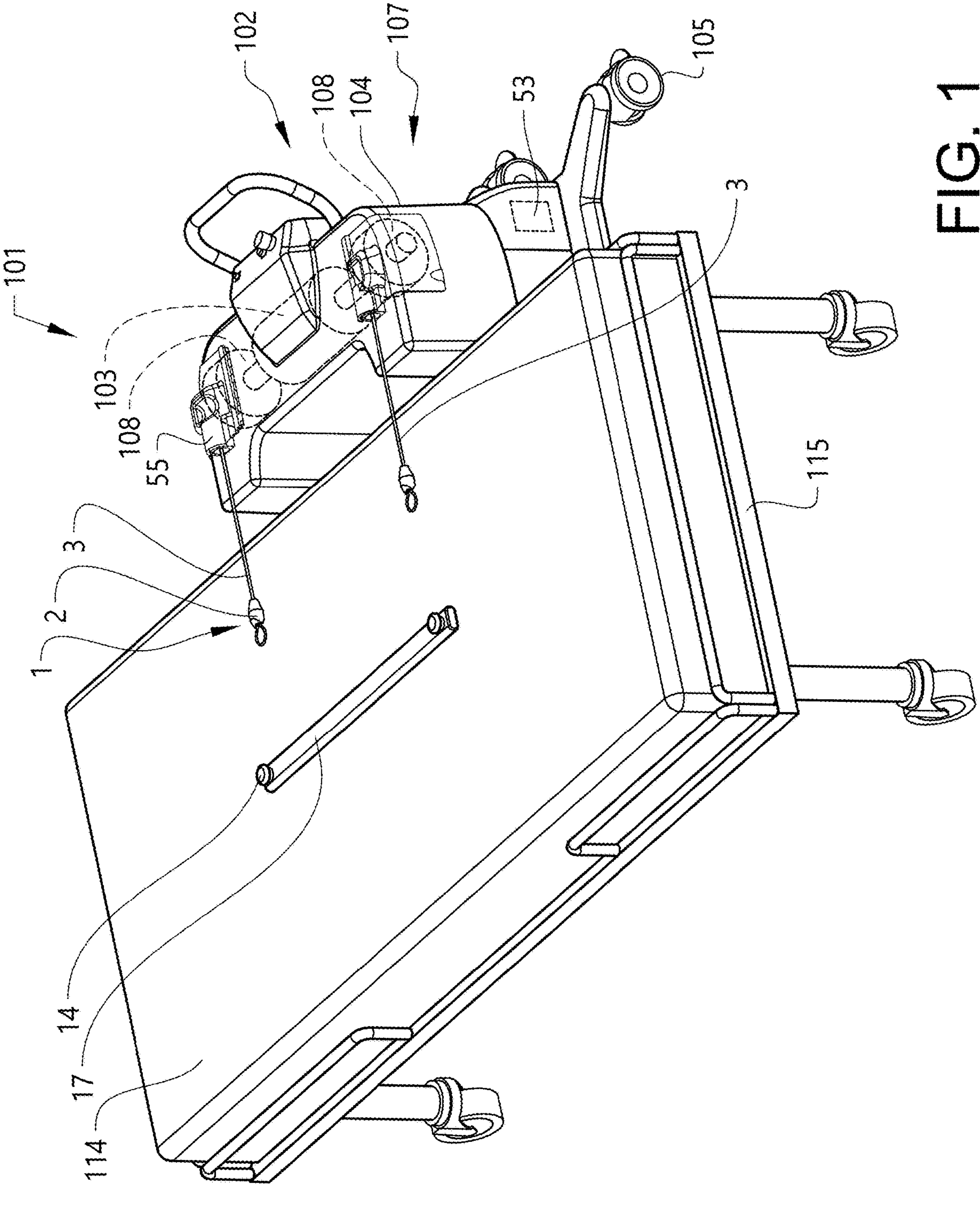
FIG. 1 shows an example of a patient transfer device according to this disclosure.

The present disclosure will now be described more fully hereinafter with reference to the accompanying drawings, in which certain aspects of the present disclosure are shown. The present disclosure may, however, be embodied in many different forms and should not be construed as limited to the embodiments and aspects set forth herein; rather, these embodiments are provided by way of example so that this disclosure will be thorough and complete, and will fully convey the scope of the present disclosure to those skilled in the art. Like numbers refer to like elements throughout the description.

It is to be understood that the present disclosure is not limited to the embodiments described herein and illustrated in the drawings; rather, the skilled person will recognize that many changes and modifications may be made within the scope of the appended claims.

The patient transfer device 101 shown in FIG. 1 comprises in the shown example a holder arrangement 1, a pulling arrangement 107 and a frame 102, onto which the pulling arrangement 107 is attached. The frame 102 is arranged to be placed on a horizontal surface, such as a floor, and is provided with wheels 105 for moving the patient transfer device 101 across this surface. The pulling arrangement 107 comprises a motor 103 connected to first and second (left and right) laterally spaced apart wire bobbins 108 and an outer casing 104 that covers and protects the motor 103 and the wire bobbins 108 from contamination caused by for example contact with dust or bodily fluids from a patient that is transferred using this patient transfer device 101. The outer casing may be removed completely or may be attached with hinges, such that the outer casing can be opened when the wire bobbins 108 are to be cleaned or replaced. The casing may be provided with removable pads.

The patient transfer device 101 comprises means for vertically adjusting the position of the pulling arrangement 107. This may for example be an electrical motor (not shown) arranged in the frame 102 that can move the pulling arrangement 107 along a vertical track or groove in the frame 102.

Figure 3:
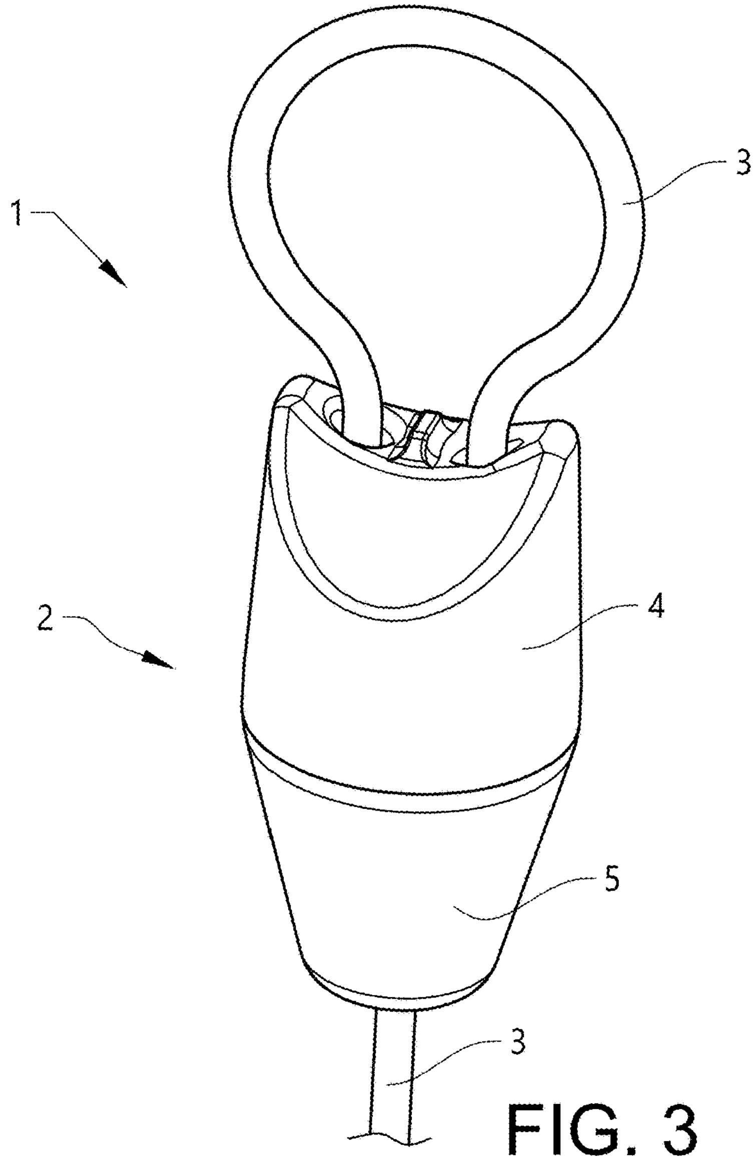
FIG. 3 shows a holder arrangement.
Figure 4:
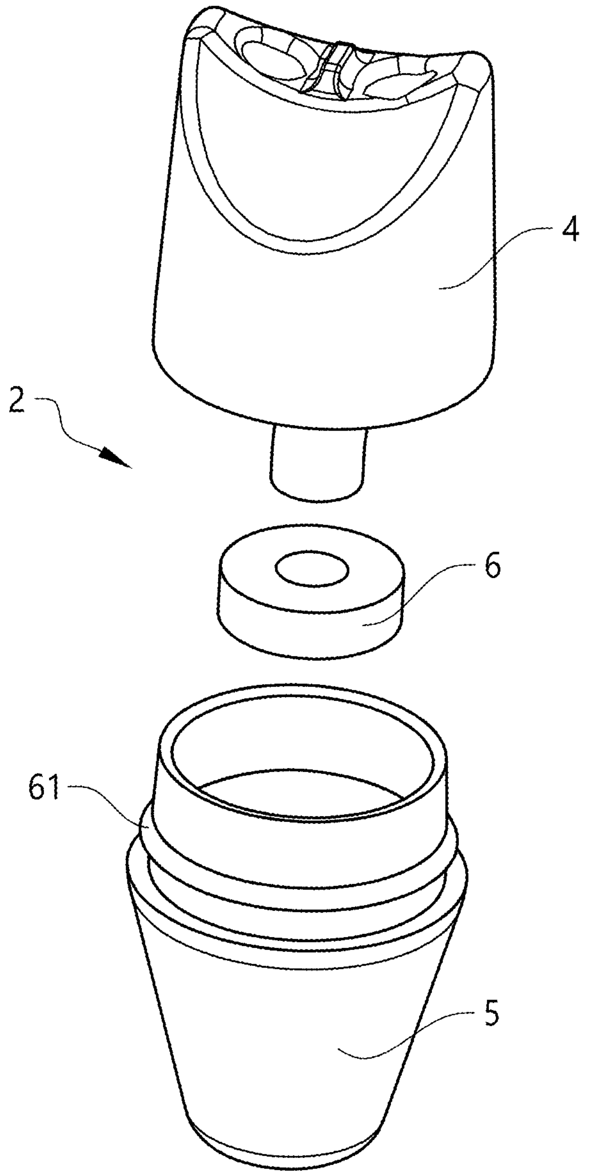
FIG. 4 shows parts of a holder element forming part of the holder arrangement according to FIG. 3.
Figure 5:
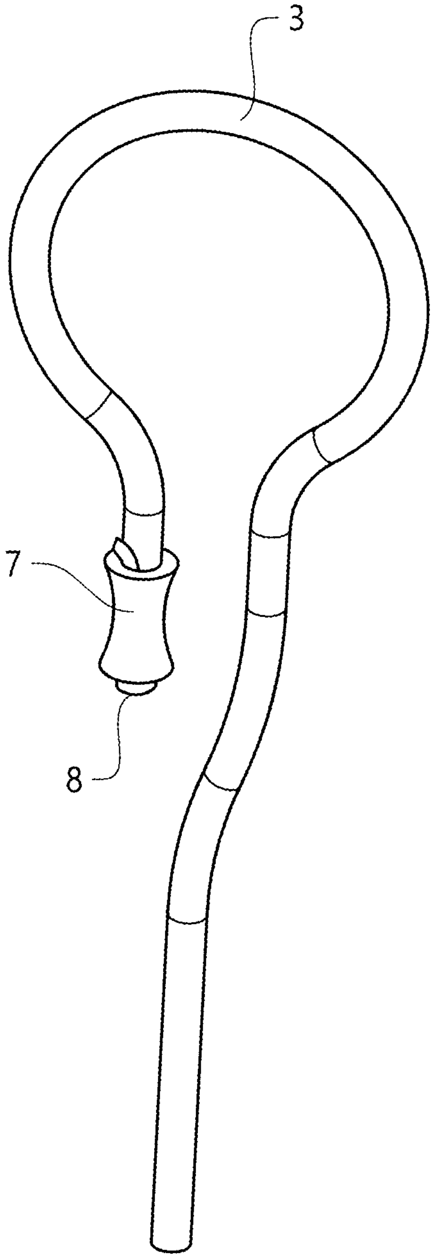
FIG. 5 shows a part of a pulling wire used in the holder arrangement according to FIG. 3.

First and second laterally spaced-apart pulling wires 3 wind up on the corresponding wire bobbin 108 when retracting the pulling wires 3, which is done by operating the motor 103 and thus rotating the bobbins 108. Each bobbin 108 is mechanically connected to the motor 103, either directly to the motor or to a shaft driven by the motor. A holder element 2 (shown in more detail in FIG. 3) is arranged in connection to a first end 8 of each of the two wires 3. The holder arrangements 2 are adapted to be releasably attached, by means of a loop of the pulling wire 3, to a corresponding knob 14 arranged on a rod or sheet member 17, which in this example is an elongated connecting member. In other words, the rod 17 may be provided with at least one knob, and the holder arrangement 2 is connectable to the sheet member so as to hold the sheet in place between the knob and holder arrangement when connected. The holder arrangements may also be releasably attached to a movable mattress, e.g. via a mattress member attached to a movable mattress and a snap hook.

Figure 2:
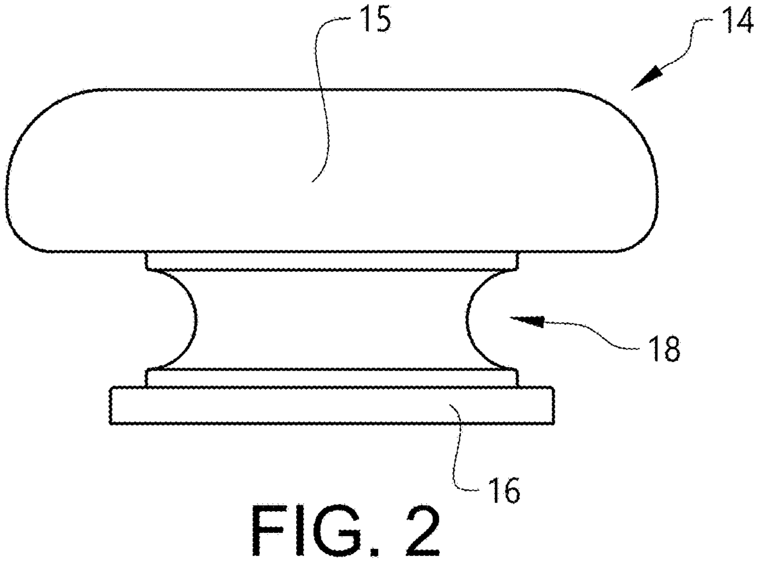
FIG. 2 shows a knob useful for connecting a holder arrangement to a sheet.

FIG. 2 shows an example of a knob 14 useful for connecting the holder arrangement 2 to a sheet. FIGS. 3-8*b* show the structure of the holder element 2 and the arrangement of the pulling wire 3 at the holder element 2.

As shown in FIG. 2, the knob is provided with a head 15 and a stem 16. The stem has a circular cross section and the head 15 is larger than the stem 16. The stem is provided with a circumferential rounded/concave knob groove 18. The height of the groove 18 equals in one example the diameter of the pulling wire 3. However, the height is preferably slightly larger than the diameter, such as at least 10% larger, and more preferably 20% larger. The sheet may thereby be clamped between the groove and the loop in a secure manner with a tight fit. Furthermore, the diameter of the groove preferably is larger than three times the diameter of the pulling wire. This allows a sheet to be clamped between the loop and the groove in a secure and tight manner, which will reduce the contact load on the sheet. In the example of FIGS. 3-7*b*, the pulling wire has a diameter of 3 mm and the groove 18 has a height of 6 mm.

As shown in FIGS. 3-8*b*, the holder arrangement 1 comprises a stop arrangement 7 configured to hold the first end 8 of the pulling wire 3 in place with respect to the holder element 2. The holder element 2 encapsulates the stop arrangement 7. The holder element 2 is provided with first, second and third apertures 9, 10, 12 and the stop arrangement 7 is arranged inside the holder element 2 at the first aperture 9. The pulling wire 3 extends out from the holder element 2 via the first aperture 9 and back into the holder element 2 via the second aperture 10 so as to form the wire loop outside of the holder element 2 between the first and second apertures 9, 10. The pulling wire 3 extends out from the holder element 2 via the third aperture 12 and further towards the pulling arrangement 107. The pulling wire 3 is free to move in relation to the holder element 2 between the second and third apertures 10, 12 so that the loop of the wire 3 can be tightened or decreased when pulling the pulling wire 3 out from the third aperture (12) and so that the loop of the pulling wire 3 can be loosened or increased when pulling the pulling wire 3 out from the second aperture 10.

The stop arrangement 7 comprises in this example a ferrule arranged around a bent/folded end part of the pulling wire 3, wherein the ferrule is clamped onto the pulling wire 3 so as to be firmly attached thereto. The ferrule has, at least at its end parts, a diameter that is larger than that of a first aperture 9 so that it is prevented from getting loose from the holder element 2.

To allow mounting of the wire 3 into the holder element 2, the holder element 2 comprises a first and a second connectable portions 4, 5. The first and second apertures 9, 10 are arranged in the first portion 4 and the third aperture 12 is arranged in the second portion 5. The two portions 4, 5 fully encapsulate the stop arrangement 7 when connected. The wire 3 can be arranged in the holder element 2 before connecting the two portions 4, 5.

The first and second portions 4, 5 of the holder element 2 are arranged so that a part of one of the portions, in this case the second portion 5, is inserted into the other portion, in this case the first portion 4, when the two portions are pushed together and connected so as to form the holder element 2. The first and second portions 4, 5 are provided with a pair of complementary and circumferentially extending snap-lock members 61, 62 that engage when the first and second portions 4, 5 are pushed together and connected. This could be arranged in other ways, for instance, the holder element 2 could instead be designed so that a part of the first portion 4 is to be inserted into the second portion 5.

As shown in FIGS. 4, 6, 7*a* and 8*b*, the complementary and circumferentially extending snap-lock members include in this case a flange 61 arranged onto the second portion 5 and a groove 62 arranged onto the first portion 4. The flange 61 has an inclined side directed towards the first portion 4 for facilitating passage of the snap-lock members 61, 62 when pushing the first and second portions 4, 5 together. Further, the flange 61 has a straight side directed in the opposite direction (away from the first portion 4) so as to prevent unintentional passage of the snap-lock members 61, 62 when the first and second portions 4, 5 have been pushed together and connected. All in all, this simplifies the procedure for connecting the two portions and provides for a secure connection.

Figure 6:
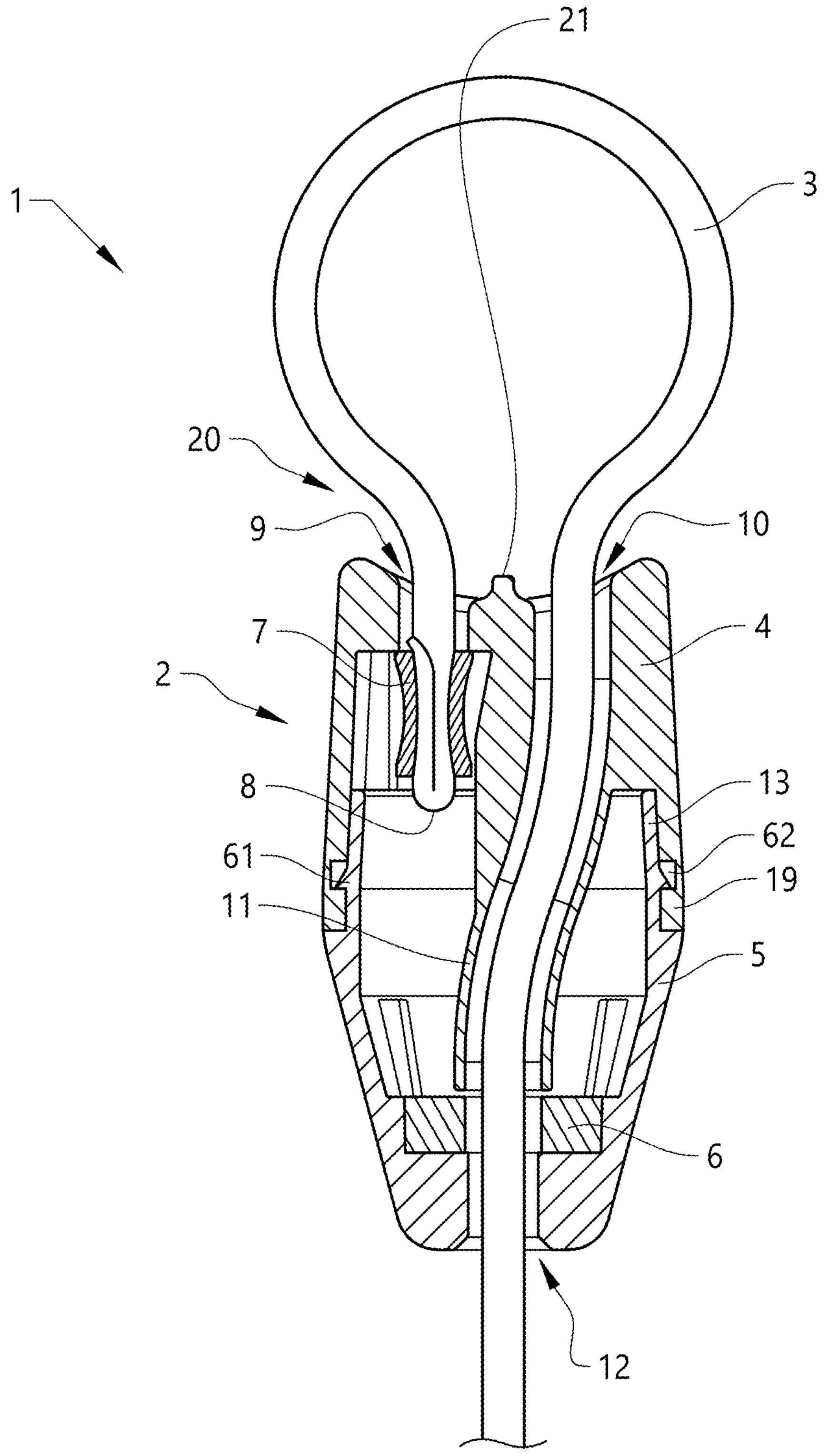
FIG. 6 shows a cross-sectional view of the holder element with a pulling wire arranged therein.

As shown in FIG. 6, the holder element 2 is provided with a wire guiding channel between the second and third apertures 10, 12 through which the pulling wire 3 runs. A part of the wire guiding channel is formed by a guiding tube 11 that is connected to the first portion 4 and extends towards the second portion 5.

The magnet 6 arranged in the holder element 2 is provided with a through hole through which the pulling wire 3 runs. The through hole forms part of the wire guiding channel. The magnet 6 is arranged at an inside of the second portion 5 in a recess facing the first portion 4 of the holder element 2. The guiding tube 11 is adapted to hold the magnet 6 in place when the first and second portions 4, 5 are interconnected.

When connecting to the knob, the loop is first arranged in an enlarged configuration with a diameter larger than the knob. The loop is thereafter arranged around the knob with the sheet in between the loop and the knob. The loop is thereafter tightened by pulling the wire away from the holder element and the knob. This reduces the diameter of the loop and locks the holder arrangement in place with respect to the sheet and the knob.

The first and the second portions 4, 5 may be connected in different ways. In the example holder arrangement demonstrated in FIGS. 6 and 7-8, the first portion 4 comprises a first rim 19 and the second portion 5 comprises a second rim 13. The second rim has a smaller circumference than the first rim, and the second portion may be press-fitted into the first portion. In the shown example, a snap-lock function is added. The respective rims may alternatively be threaded and the two portions can be screwed together. The two portions may also be held together by one or more screws, bolts, or similar. Preferably, the two portions are releasably attached to each other.

When the first 4 and the second 5 portions are interconnected, they encapsulate the stop arrangement 7. In other words, one or both portions enclose the stop arrangement. The stop arrangement is thereby enclosed by an internal volume defined by the first and/or the second portions.

An important aspect for any equipment used in a hospital environment or similar is cleanliness. The disclosed holder arrangement 1 comprises few simple parts that are easy to manufacture and easy to clean. The stop arrangement 7 may be a place where dirt accumulates. In addition, it may be difficult to clean the stop arrangement. The encapsulation of the stop arrangement therefore makes the disclosed holder arrangement easy to clean.

Any of the first 9, second 10, and third 12 apertures may be dimensioned such that the pulling wire 3 fits snugly in the apertures. For example, a diameter of an aperture may be 10% larger than a diameter of the pulling wire. This way, the amount of dirt entering the inside of the holder element 2 is reduced. Optionally, one or more of the apertures comprise a gasket or seal that further seals any space around the pulling wire to the inner surface of aperture. Such seal may be a brush seal. Furthermore, the first aperture may be configured such that the pulling wire has a snugger fit in that aperture compared to the other apertures since the first end 8 of the pulling wire is held in place with respect to the first aperture 9. The second 10 and third 12 apertures are preferably configured such that the pulling wire can run relatively unhindered through the apertures such that the loop can be made larger and smaller.

The holder element 2 preferably has a rounded shape. This way, less dirt can be accumulated on the holder element. The rounded shape further reduces deterioration of surfaces the holder element slides across, such as surrounding mattresses, sheets, and plastic material. In the example holder element in FIG. 3, the first portion 4 and the second portions have respective frustoconical shapes extending in the extension direction of the pulling wire 3 from the third aperture 12. In addition, the holder element 2 preferably has rounded shape to provide low friction when the holder element slides across a surface. Furthermore, the first portion may comprise flat portions 23, as is demonstrated in the example of FIG. 7*b*, which also provide low friction. These flat portions are arranged at an angle relative to an extension direction of the pulling wire from the third aperture.

Figure 7A:
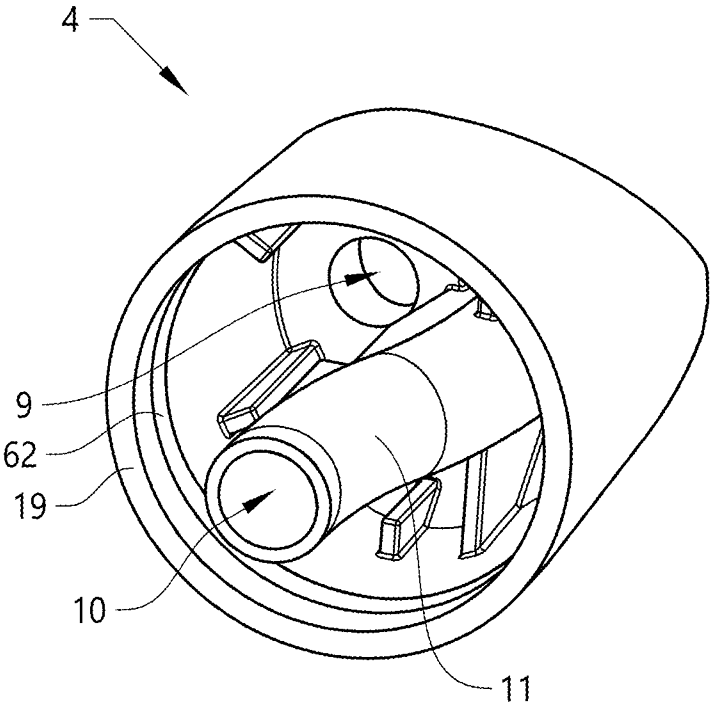
FIGS. 7*a* and 7*b* show different views of a first portion of the holder element.
Figure 7B:
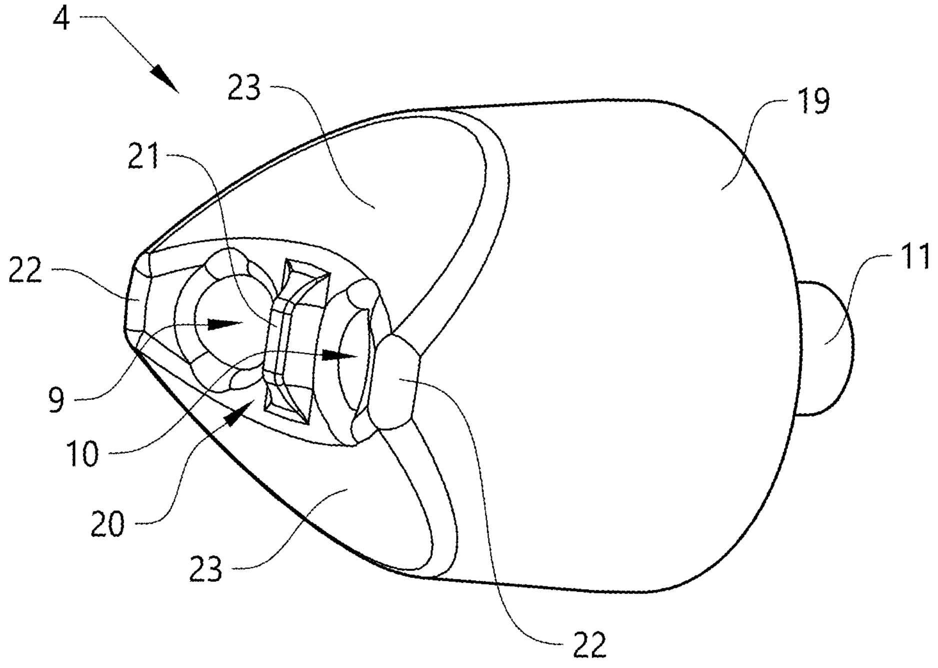
Figure 8A:
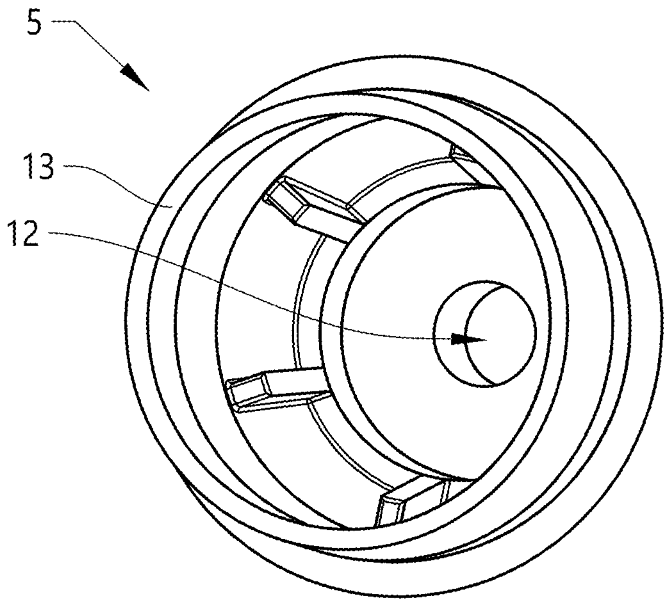
FIGS. 8*a* and 8*b* show different views of a second portion of the holder element.
Figure 8B:
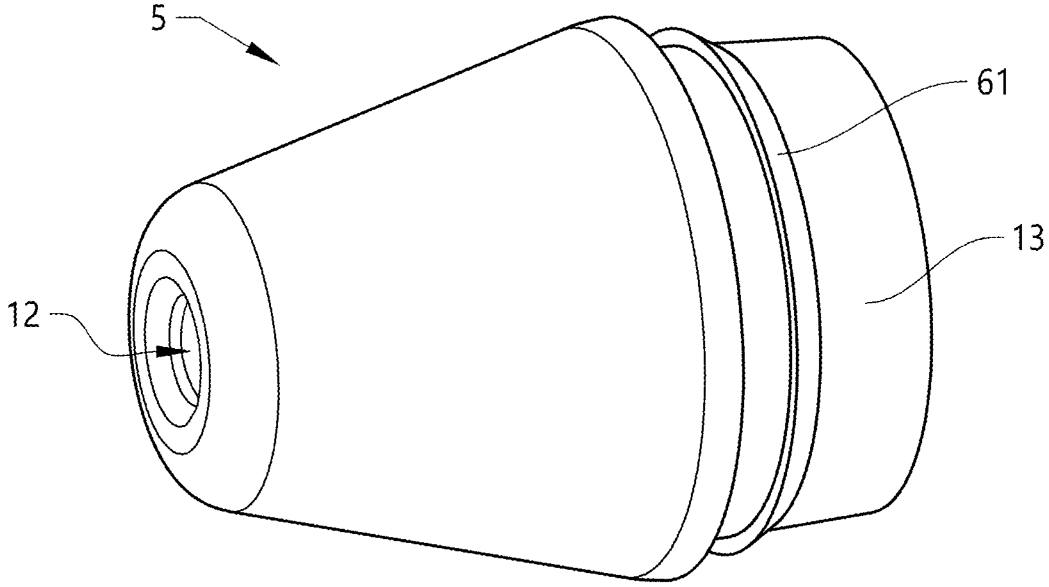

As is shown in FIG. 7*b*, the first portion 4 of the holder arrangement 2 may be provided with a front surface 20 on which the first and the second apertures 9, 10 are arranged. The pulling wire may bear on the front surface when the loop is in a smallest configuration, i.e., when the pulling wire is maximally retracted from the holder element without being connected to the knob. In some cases, there may be a very small gap between the front surface and the pulling wire. In any case, it may be difficult for an operator of the holder arrangement to grab the pulling wire for increasing the size of the loop before it is connected with a knob or snap hook. Therefore, as is shown in FIG. 7*b*, the first surface may be provided with a protrusion 21 arranged between the first and the second apertures and arranged extending from the first surface. The protrusion is configured to provide a (larger) gap between the pulling wire and the front surface when the loop is in said smallest configuration to facilitate grabbing the pulling wire 3. The protrusion 21 may e.g. have an extension length that is 0.2 to 2 times the diameter of the pulling wire.

Figure 9A:
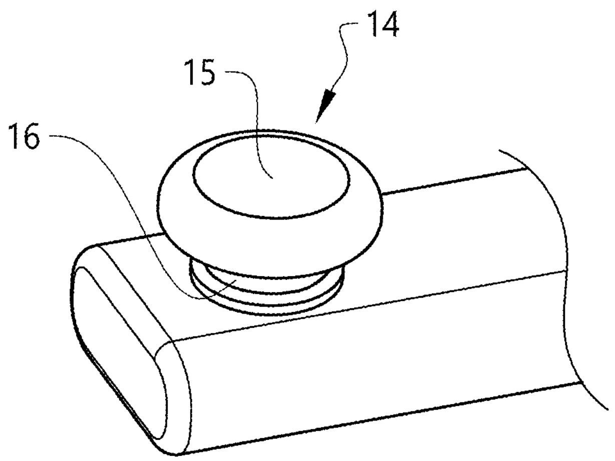
FIG. 9*a* shows an example of a knob arranged onto a rod.
Figure 9B:
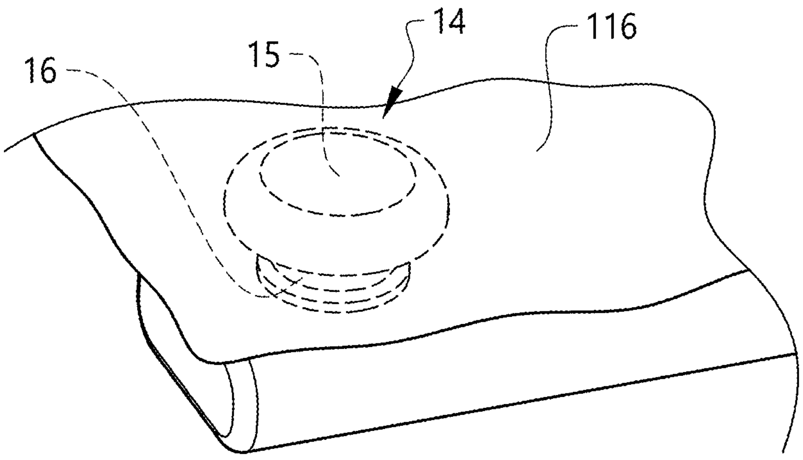
FIG. 9*b* shows the knob of FIG. 9*a* with a sheet positioned on top.
Figure 9C:
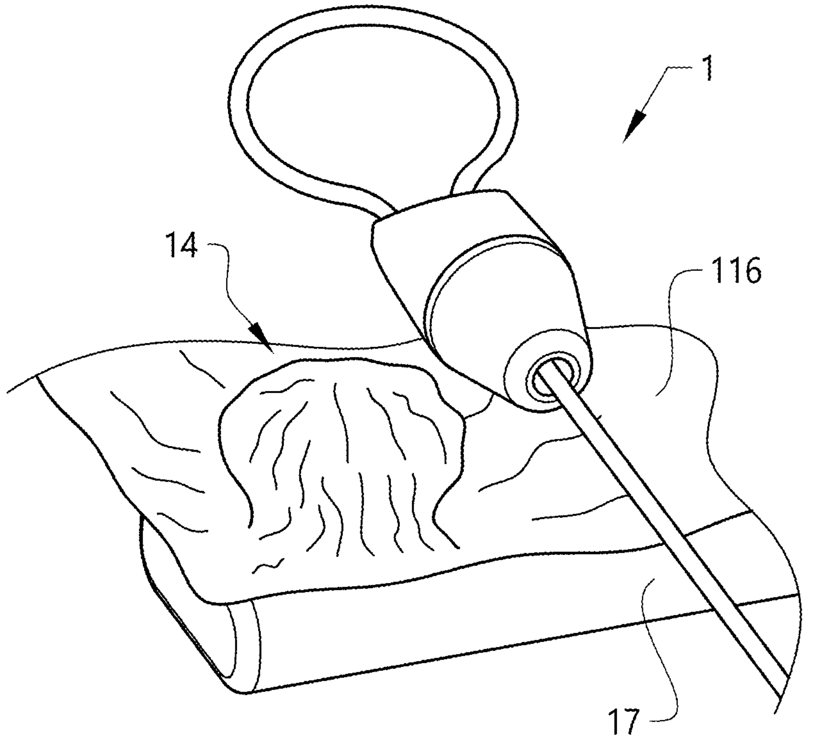
FIG. 9*c* shows the holder arrangement about to be connected to the knob and sheet of FIG. 9*b*.
Figure 9D:
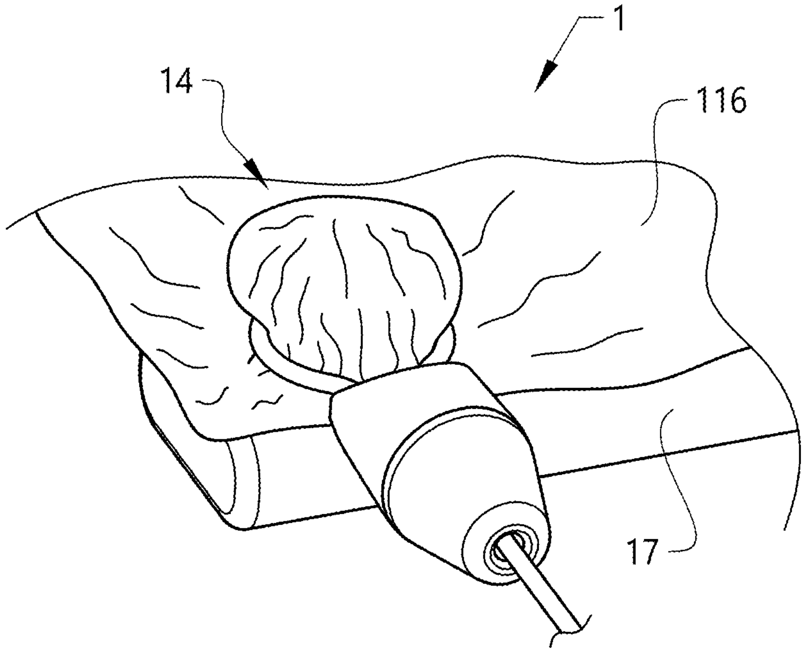
FIG. 9*d* shows the holder arrangement connected to the knob and sheet of FIG. 9*b*, FIGS. 10*a* and 10*b* show the patient transfer device of FIG. 1 when used to transfer a patient from a first surface to a receiving surface.

FIGS. 9*a*-9*d* illustrate the attachment of a sheet 116 to the holder arrangement 1 involving a knob 14 fixed to a rod 17, see FIG. 9*a*. FIG. 9*b* shows the sheet 116 placed on top of the knob 14, FIG. 9*c* shows the holder arrangement 2 about to be connected, and FIG. 9*d* shows the holder arrangement 2 connected to the knob 14 and sheet 116. As shown in FIG. 9*c*, the diameter of the loop of the pulling wire 3, which thus forms part of the holder arrangement 1, is larger than the diameter of the head 15 of the knob 14. When the wire loop is in place around the knob 14 with the sheet 16 in-between, the loop is tightened by pulling the wire 3.

Figure 10A:
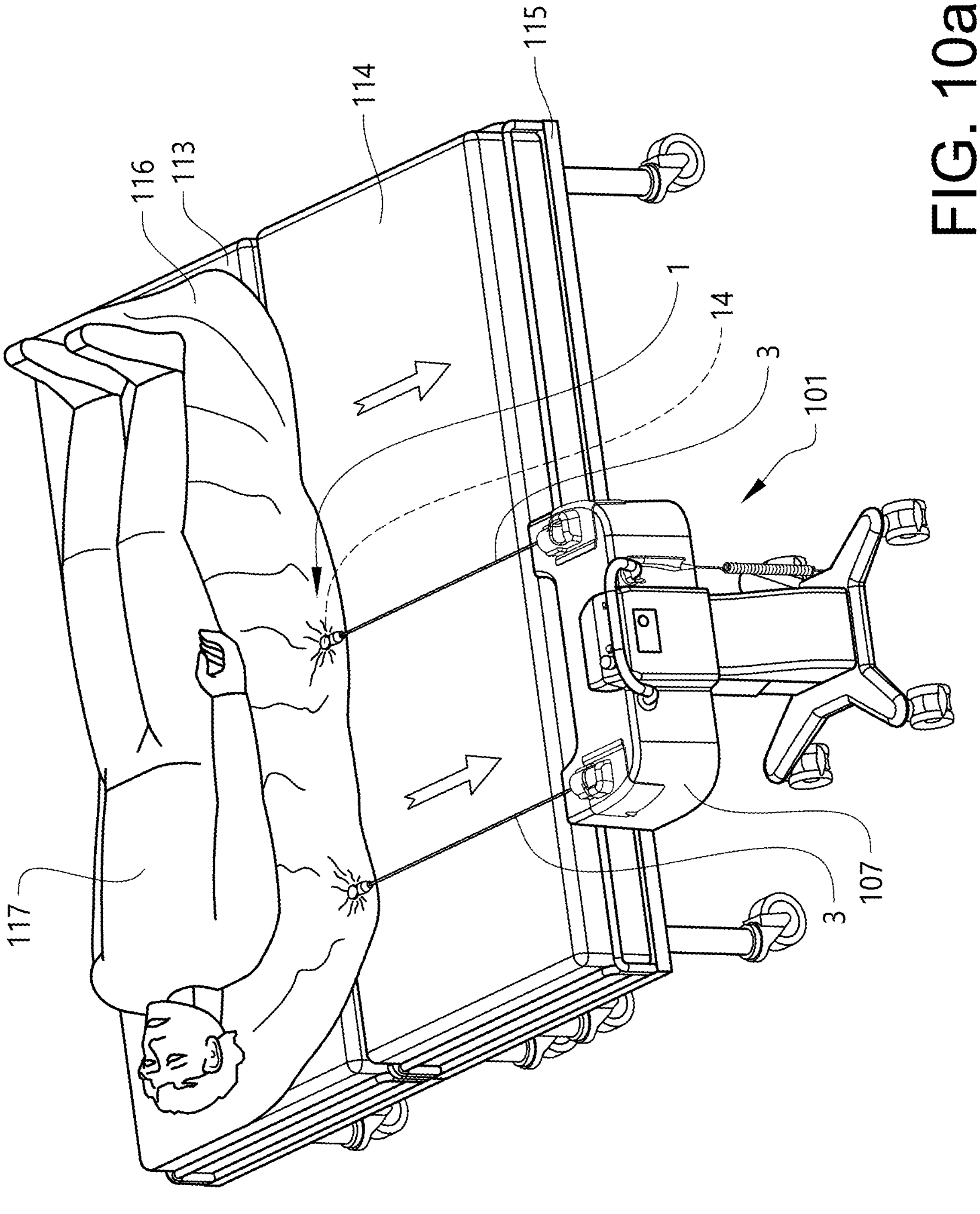
Figure 10B:
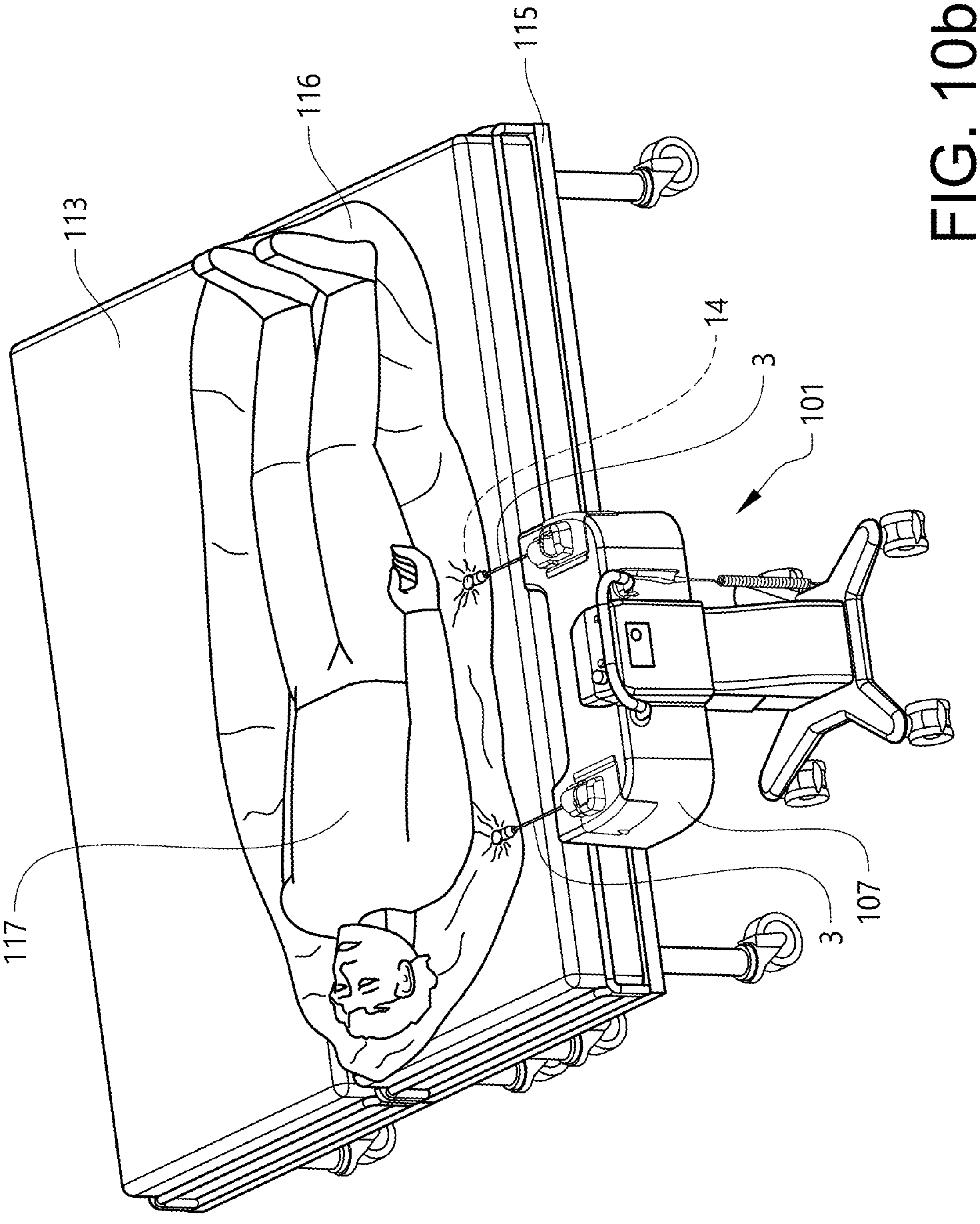

FIGS. 10*a*-10*b* show perspective views illustrating the use of the patient transfer device 101 in transferring a patient 117 from a first surface 113, in the illustrated case from a first bed, to a receiving surface 114, in the illustrated case to a receiving bed 115. In FIG. 10*a*, the patient 117 is lying on a sheet 116 on the first bed, and the holder arrangement 1 of each pulling wire 3 of the patient transfer device 101 is connected thereto. The receiving bed 115 is arranged side-by-side with the first bed, and the patient transfer device 101 is arranged on the opposite side of the receiving bed than the first bed. In FIG. 10*b*, the motor 103 of the patient transfer device 101 has been operated so as to retract the pulling wires 3 and thus move the holder element 2, the holder arrangement 1, the sheet 116 and the patient 117 towards the patient transfer device 101.

The sheet member 17 may be a stiff rod or may be a flexible wire of some kind. The knobs are mounted on the rod in a spaced apart manner, in the shown example with a distance corresponding to the distance between the wire bobbins 108 of the pulling arrangement 107. As an alternative, the knobs 14 may be located at opposite short ends of a rod so as to project in opposite horizontal directions.

As an alternative to what is shown in, for instance, FIGS. 10*a* and 10*b*, the pulling arrangement 107 of the patient transfer device 101 may be mounted on an adjustable movable arm mounted to a wall or ceiling, i.e. instead of being arranged onto a frame 102 with wheels 105.

The pulling wire 3 is preferably a wire that is easy to clean and that does not interfere with other equipment in a hospital environment. Thus, the pulling wire 3 preferably is made from a synthetic material such as polyester and/or dyneema.

As shown in FIGS. 11-18, the patient transfer device 101 further comprises a wire guide 55 configured to guide the pulling wire 3 towards the wire bobbin 108 when the pulling wire 3 is retracted. The wire guide 55 is arranged on the casing 104 of the pulling arrangement 107 and it is attached to the upper surface of the casing 104 by means of screws.

Figure 11:
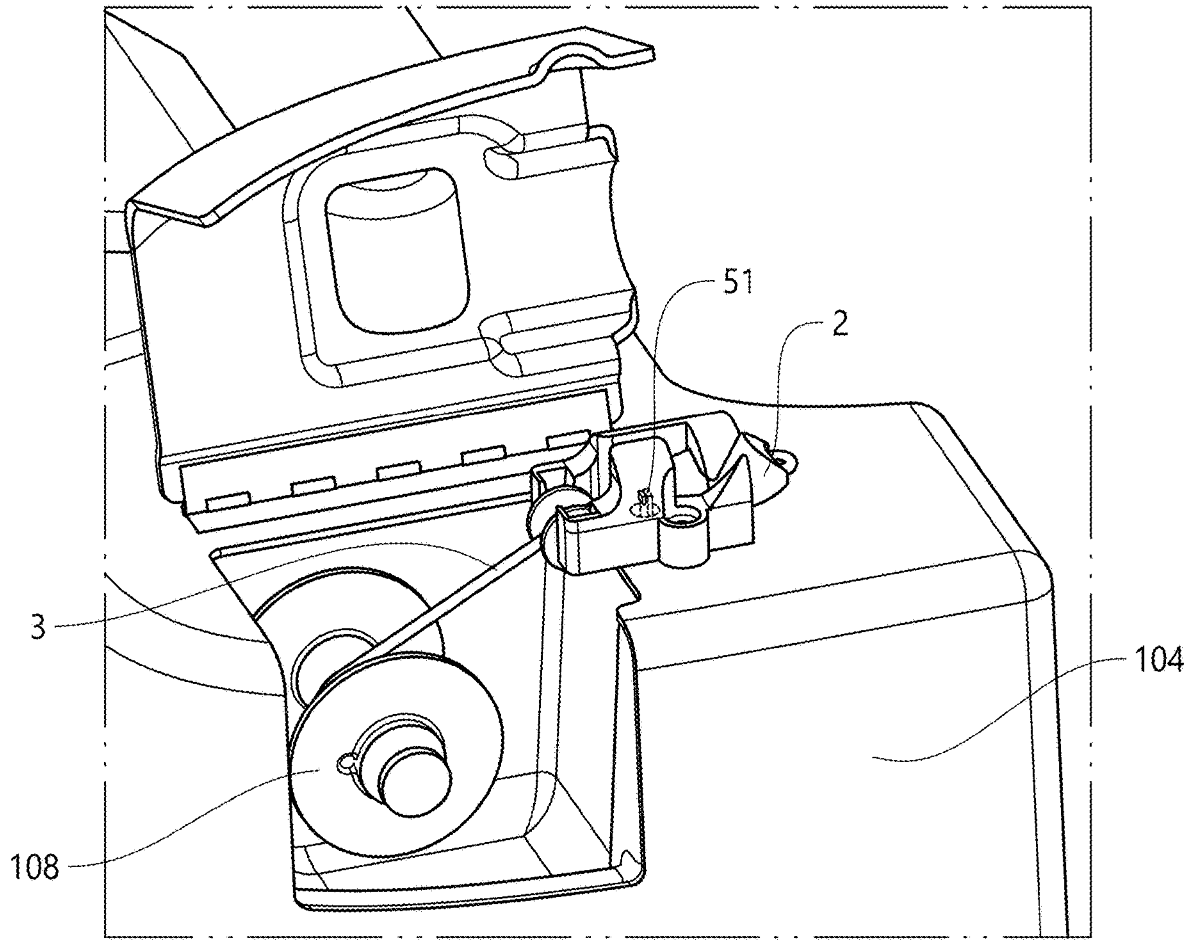
FIG. 11 shows a wire guide and a corresponding wire bobbin of the device of FIG. 1.
Figure 12:
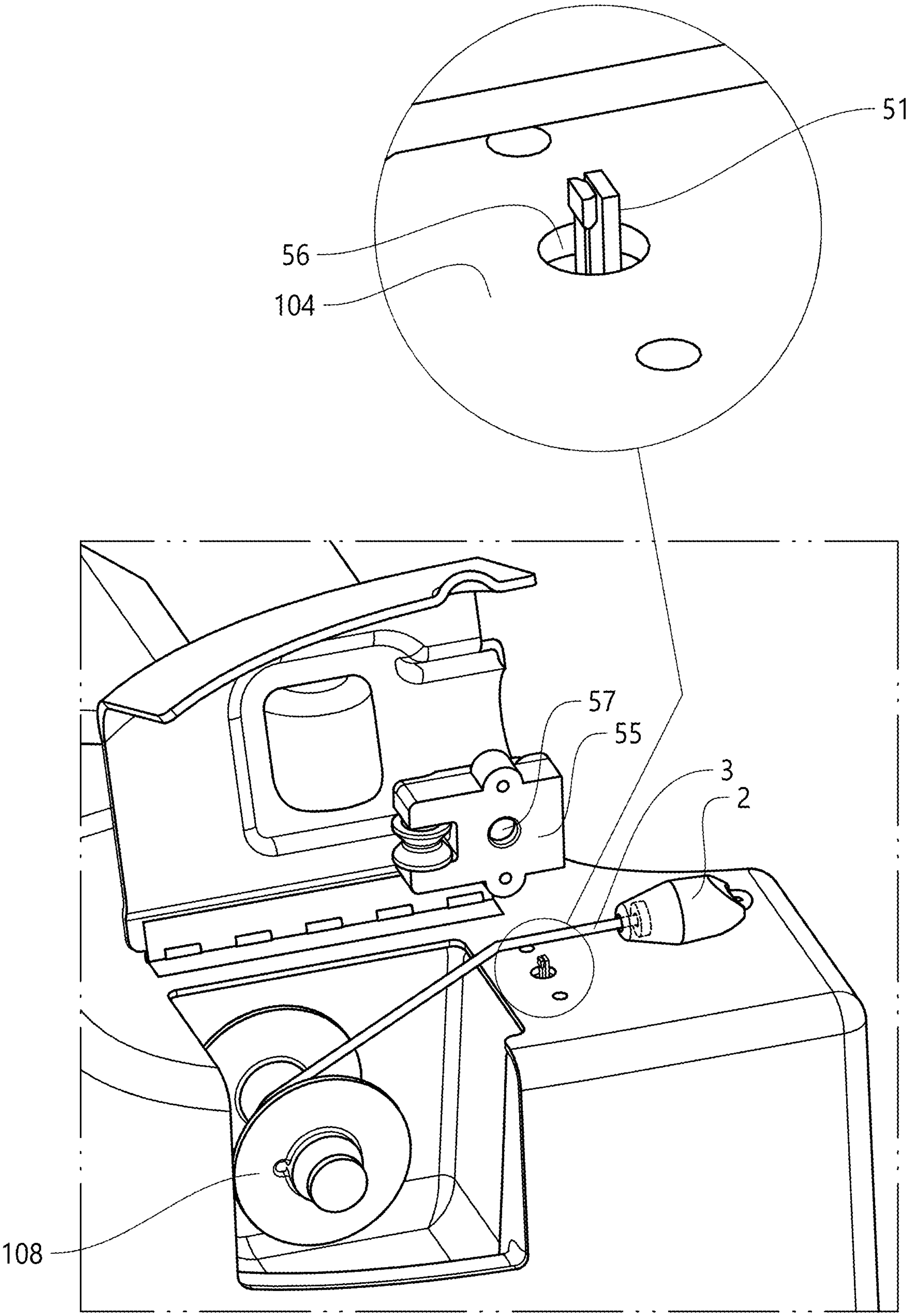
FIG. 12 shows a similar view as FIG. 11 but with the wire guide moved from its real position to more clearly illustrate the position of a proximity sensor.
Figure 13:
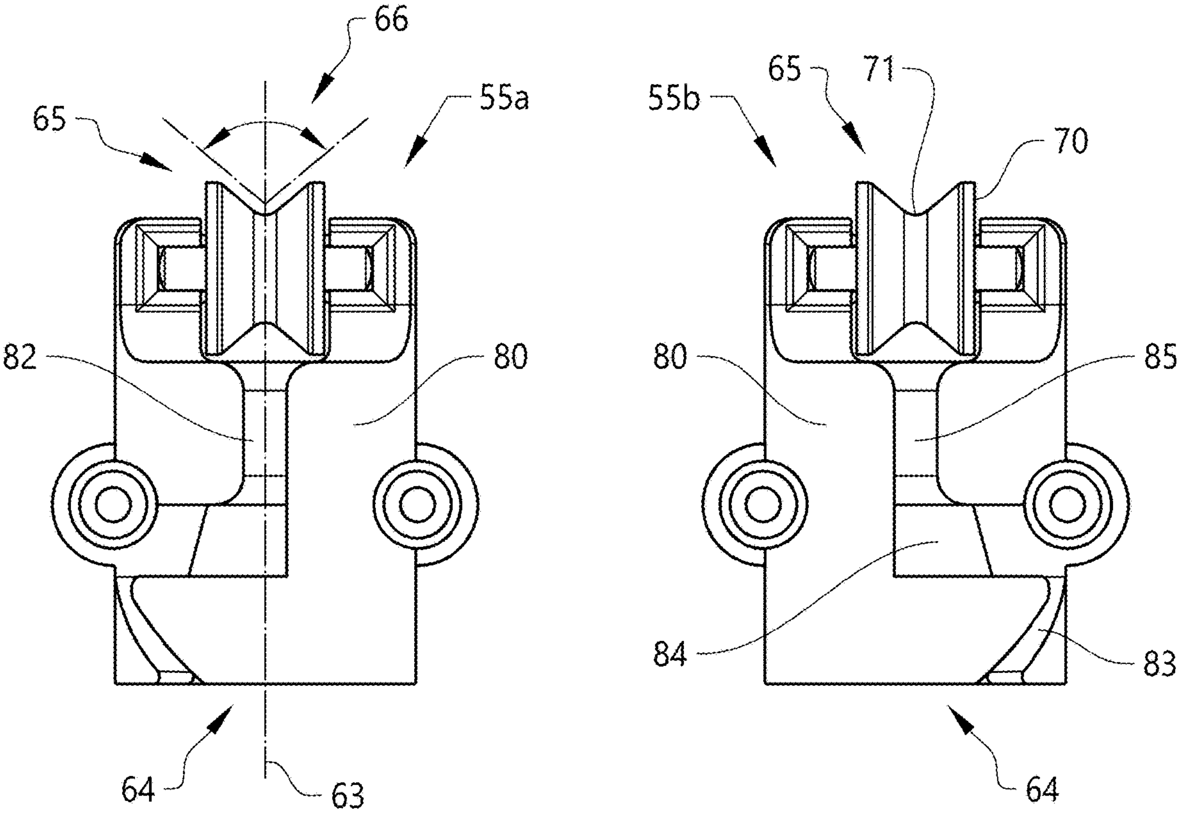
FIG. 13 shows a top view of left and right mirror-inverted wire guides of the device of FIG. 1.
Figure 14:
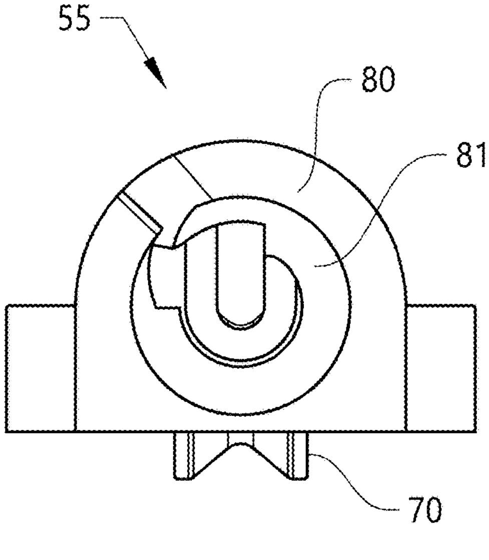
FIG. 14 shows a side view of a wire path entrance side of one of the wire guides.
Figure 15A:
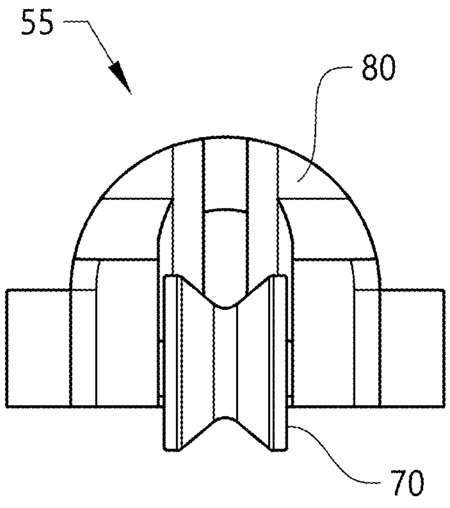
FIGS. 15*a* and 15*b* show side view of a wire path exit side of one of the wire guides, including a wheel in FIG. 15*a* and with the wheel removed in FIG. 15*b*.
Figure 15B:
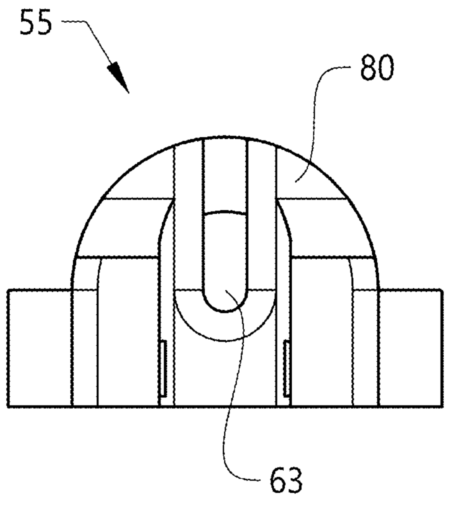
Figure 16:
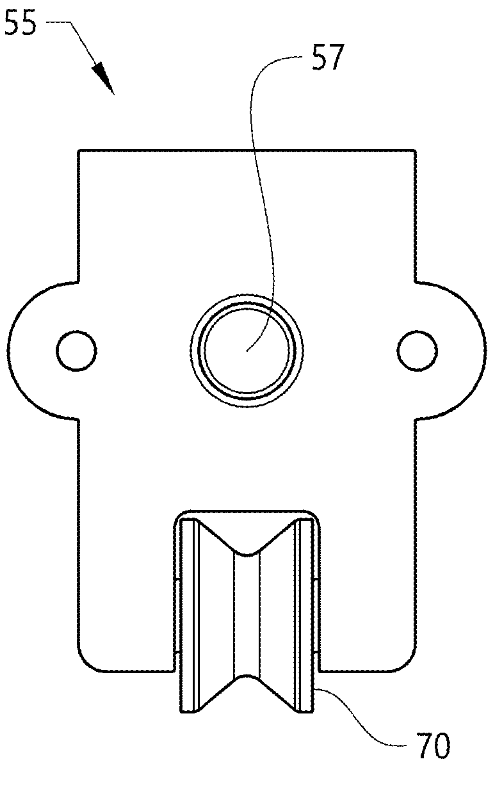
FIG. 16 shows a bottom view of one of the wire guides.
Figure 17:
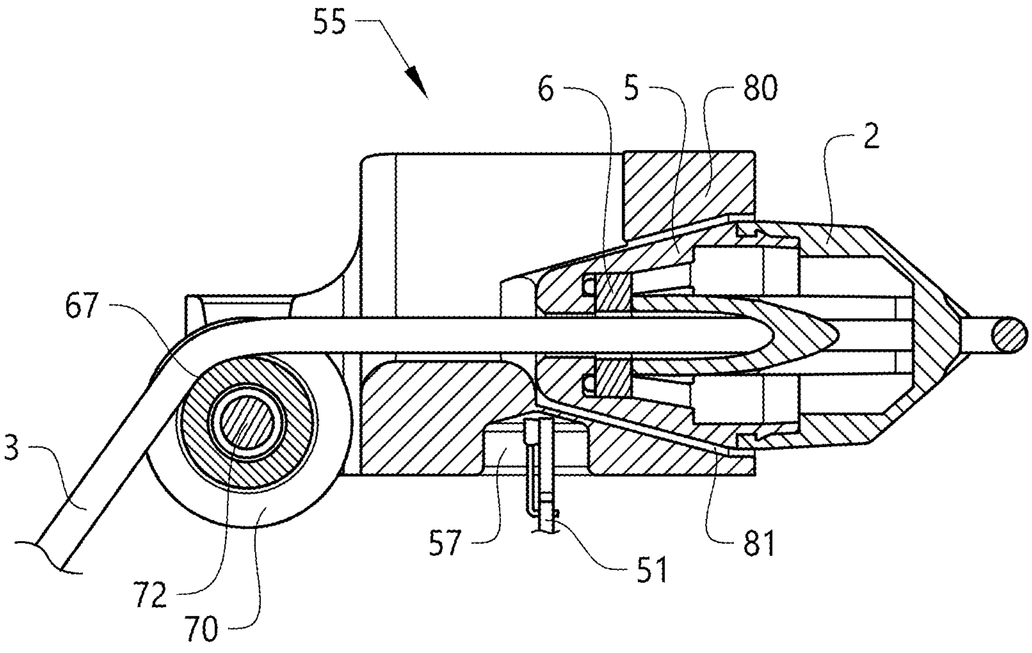
FIG. 17 shows a sectional side view of one of the wire guides with the pulling wire fully retracted and the holder element partly inserted into the wire guide.
Figure 18A:
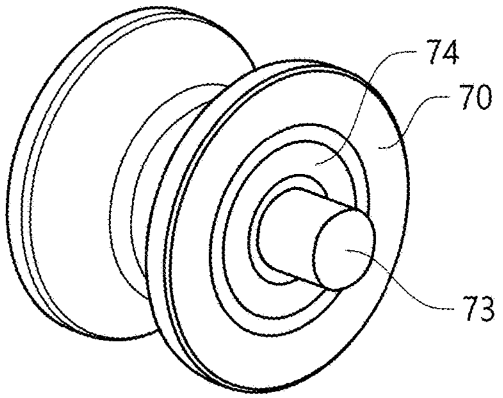
FIGS. 18*a* and 18*b* show the wheel and wheel structure of one of the wire guides.
Figure 18B:
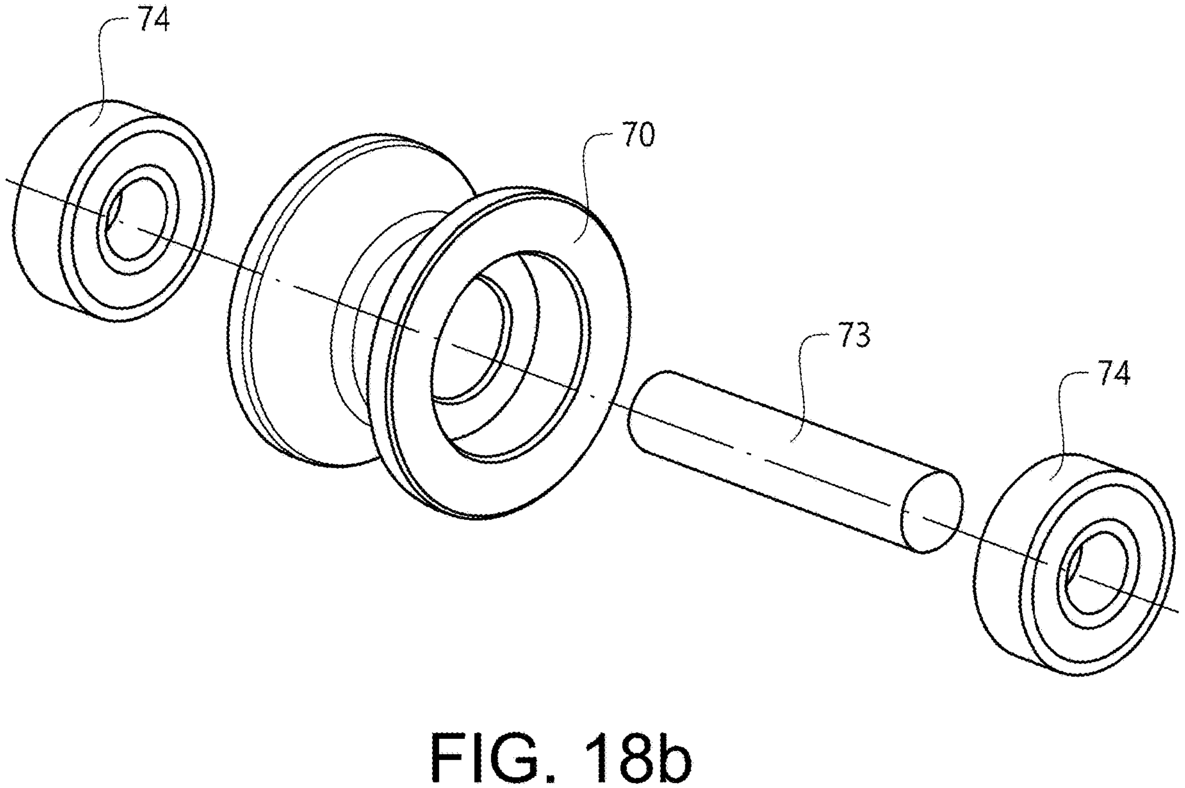
Figure 19A:
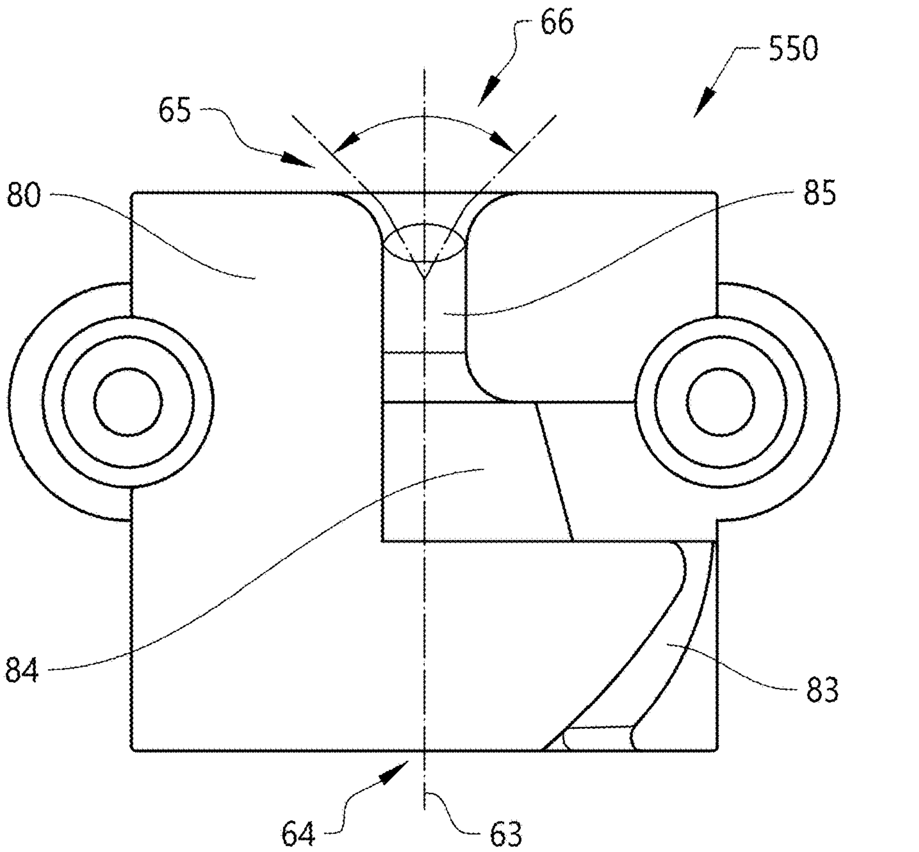
FIGS. 19*a* and 19*b* show a top view (FIG. 19*a*) and a sectional side view (FIG. 19*b*) of another embodiment of the wire guide.
Figure 19B:
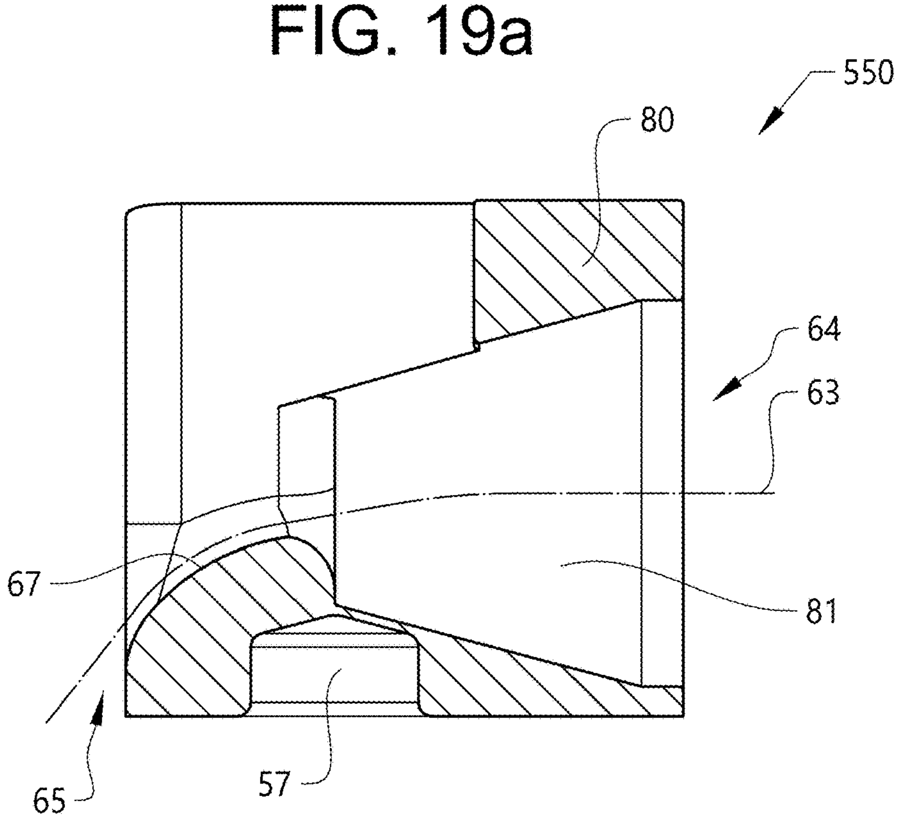

FIG. 11 shows one of the wire guides 55 and its corresponding wire bobbin 108;

FIG. 12 shows a similar view as FIG. 11 but with the wire guide 55 moved from its real position to more clearly illustrate the position of a proximity sensor 51; FIG. 13 shows a top view of the left and right mirror-inverted wire guides 55; FIG. 14 shows a side view of a wire path entrance side of one of the wire guides 55; FIGS. 15*a* and 15*b* show side views of a wire path exit side of one of the wire guides 55, including a wheel 70 in FIG. 15*a* and with the wheel 70 removed in FIG. 15*b*; FIG. 16 shows a bottom view of one of the wire guides 15; FIG. 17 shows a sectional side view of one of the wire guides 55 with the pulling wire 3 fully retracted and the holder element 2 partly inserted into the wire guide 55; and FIGS. 18*a* and 18*b* show the wheel 70 and wheel structure of one of the wire guides 55. FIGS. 19*a* and 19*b* show a top view (FIG. 19*a*) and a sectional side view (FIG. 19*b*) of another embodiment of the wire guide 550.

FIGS. 11-19 show that each wire guide 55, 550 is arranged to define a wire path 63 having a path entrance 64 facing the holder arrangement 1 and a path exit 65 facing the wire bobbin 108. The wire path is at least partly defined by an inside of a cylindrical element 80 that surrounds the wire path 63 along a longitudinal direction thereof. A bottom of the wire path 63 is substantially U-shaped.

The wire path 63 comprises a widening portion 66 at the path exit 65, wherein the widening portion 66 comprises an increasing width and/or height of the wire path 63 in a direction along the wire path 63 and towards the path exit 65 so as to allow the pulling wire 3 to be directed in different angles corresponding to different positions of a longitudinal axis of the wire bobbin 108 while avoid rubbing the pulling wire 3 against a sharp edge at the path exit 65 when the pulling wire 3 is retracted and wind up around the wire bobbin 108. The widening portion 66 is adapted to the length of the longitudinal axis of the wire bobbin 108 and to the distance between the path exit 65 and the wire bobbin 108 so that the pulling wire 3 can be directed in all relevant angles with reference to the longitudinal axis of the wire bobbin 108 while avoid rubbing the pulling wire 3 against any edge at the path exit 65.

In the example shown here, a longitudinal axis of the wire bobbin 108 extends in a substantially horizontal direction and in a direction substantially perpendicular to a general direction of the wire path 63. This means the widening portion 66 at the path exit 65 comprises an increasing width, rather than height, of the wire path 63 in a direction along the wire path 63 and towards the path exit 65.

In the example shown here, the wire bobbin 108 is located at a lower level than the path exit 65. For this reason, the wire path 63 comprises a downwardly directed portion 67 at the path exit 65 so as to allow the pulling wire 3 to be directed at an angle downwards towards the wire bobbin 108 while avoid rubbing the pulling wire 3 against a horizontally directed edge at the path exit 65 when the pulling wire 3 is retracted and wind up around the wire bobbin 108.

As shown in FIGS. 11-18, the first variant of the wire guide 55 comprises a wheel 70 arranged at the path exit 65, wherein the wheel 70 is provided with a wire guiding recess 71 that extends circumferentially at an outer side of the wheel 70 and forms part of the wire path 63, see e.g. FIGS. 13*a* and 13*b*. The wire guiding recess 71 is defined between two opposite walls inclined in opposite directions so as to define a width of the wire guiding recess 31 that increases with an increasing distance from a center point 72 of the wheel 70.

The wheel 70 forms both the widening portion 66, by means of the increasing width of the wire guiding recess 71 at the side of the wheel 70 facing the bobbin 108, as well as the downwardly directed portion 67, by means of the circular outer side of the wheel 70 that directs the wire 3 downwards towards the bobbin 108.

FIGS. 18*a* and 18*b* show that the wheel 70 forms part of a wheel structure comprising also roller bearings 74 and a central pin 73. The wheel structure is detachable, which may be needed for cleaning purposes.

In the second variant of the wire guide 550 shown in FIGS. 19*a* and 19*b*, the widening portion 66 is formed in the cylindrical element 80 at the path exit 65 (see FIG. 19*a*). Also the downwardly directed portion 67 is formed in the cylindrical element 80 at the path exit 65 (see FIG. 19*b*).

The cylindrical element 80 is open at the path entrance 64 towards the holder element 2 and has a funnel-shaped entrance part 81 adapted to a corresponding cone-shaped end part 5 (the second portion 5) of the holder element 2 so as to receive and enclose the coned-shaped end part 5 of the holder element 2 when the pulling wire 3 is fully retracted, see e.g. FIG. 17.

Further, the cylindrical element 80 is provided with an elongated opening 82 that extends along the entire cylindrical element 80 so as to allow removal and replacement of the pulling wire 3 from/to the cylindrical element 80 without having to pass an end of the pulling wire 3 through the cylindrical element 80. As shown in e.g. FIG. 13 (right side) and FIG. 19*a*, the elongated opening 82 comprises a plurality of sections 83, 84, 85 that extend in different directions.

As shown in e.g. FIGS. 11 and 12, the pulling arrangement 107 is provided with a proximity sensor 51, one at each wire guide 55, configured to detect whether the corresponding holder element 2 has reached an end position at the wire guide 55. The proximity sensor 51 is in this example a Hall effect sensor capable of detecting the magnet 6 arranged in the holder element 2 when the magnet 6 comes sufficiently close to the sensor 51. The sensor 51 is arranged at an edge of a circuit board (not shown) and protrudes through a hole 56 in the casing 104 so as to be positioned above, in this example around 6 mm above, an upper surface of the casing 104.

The wire guide 55 is arranged on top of and around the proximity sensor 51. A recess 57 for housing the sensor 51 is provided on a lower side of the wire guide 55. The recess 57 has in this case a depth/height of 7 mm, and a sufficient diameter, to allow room for the upwardly protruding proximity sensor 51. This arrangement allows the holder element 2, and thus the magnet 6, to come close to the sensor 51 when it reaches its end position in the wire guide 55, see FIG. 17. In turn this provides for using a relatively small magnet 6 without risking that its location at the end position will not be sensed by the proximity sensor 51. And an effect of this is that it becomes possible to reduce the size of the holder element 2.

A sensor arrangement in line with what is described above is suitable also for other types of sensors, such as when the sensor is capable of detecting a piece of iron arranged in the holder element 2.

As indicated in FIG. 1, the patient transfer device 101 is provided with a control circuitry 53 configured to control operation of the patient transfer device 101 including, for instance, operation of the motor 103 in dependence of a sensor signal received from the proximity sensor 51. The control circuitry 53 is further configured to stop operation of the motor 103 when receiving a sensor signal that indicates that any of the holder elements 2 has reached the end position, i.e. that any of the holder elements 2 has assumed a position close to its corresponding proximity sensor 51. This is a safeguard function to avoid that the pulling wires 3 are retracted too much so that e.g. the holder elements 2 get stuck, which could damage the motor 103. A user may manually stop operation of the motor 103 before any of the holder elements 2 reaches its end position. The control circuitry 53 may also be configured to stop operation of the motor 103 if one of the proximity sensors 51 is not properly connected.

REFERENCE SIGNS

1: Holder arrangement
2: Holder element
3: Pulling wire
4: First portion of holder element
5: Second portion of holder element (cone-shaped)
6: Magnet
7: Stop arrangement
8: First end of pulling wire
9: Aperture
10: Aperture
11: Wire guiding tube
12: Aperture
13: Rim
14: Knob
15: Head
16: Stem
17: Sheet member
18: Knob groove
19: Rim
20: Front surface
21: Protrusion
22: Ends
23: Sloped surface
51: First proximity sensor
53: Control circuitry

55, 550: Wire guide/receiver for holder element
56: Through hole in casing
57: Recess for proximity sensor
61: Flange
62: Groove
63: Wire path
64: Wire path entrance
65: Wire path exit
66: Widening portion of wire path at path exit
67: Downwardly directed portion of wire path at path exit
70: Wheel
71: Wire guiding recess
72: Center point of wheel
73: Center pin
74: Roller bearing
80: Cylindrical element of wire guide
81: Funnel-shaped entrance part of cylindrical element
82: Elongated opening of cylindrical element
83-85: Different sections of elongated opening
101: Patient transfer device
102: Frame
103: Motor
104: Casing
105: Wheel
107: Pulling arrangement
108: Bobbin
113: First surface
114: Receiving surface
115: Bed
116: Sheet
117: Patient
201: Mattress
202: Mattress member
203: Mattress holder
204: Opening
205: Carabineer

The invention claimed is:

1. A patient transfer device for transferring a patient placed on a sheet or mattress from a first surface to a receiving surface, wherein the patient transfer device comprises:

at least one retractable pulling wire;

a pulling arrangement comprising a motor operatively connected to a rotatable wire bobbin so as to allow retraction of the pulling wire by operating the motor and rotating the wire bobbin and thereby winding up the pulling wire around the wire bobbin;

a holder arrangement configured to hold the sheet/mattress when moving the sheet/mattress and thereby transferring the patient placed thereon;

wherein the holder arrangement comprises a holder element to which the pulling wire is attached, wherein the pulling arrangement is configured to retract the pulling wire and thus move the holder arrangement and the holder element towards the pulling arrangement so as to, when the holder arrangement is arranged to hold the sheet/mattress, move the sheet/mattress towards the pulling arrangement and thereby transfer the patient placed on the sheet/mattress from the first surface to the receiving surface, wherein the patient transfer device comprises a wire guide configured to guide the pulling wire towards the wire bobbin when the pulling wire is retracted, wherein the wire guide is arranged to define a wire path having a path entrance facing the holder arrangement and a path exit facing the wire bobbin, wherein the wire path comprises a widening portion at the path exit, wherein the widening portion comprises an increasing width and/or height of the wire path in a direction along the wire path and towards the path exit so as to allow the pulling wire to be directed in different angles corresponding to different positions of a longitudinal axis of the wire bobbin while avoid rubbing the pulling wire against a sharp edge at the path exit when the pulling wire is retracted and wind up around the wire bobbin, wherein the holder arrangement comprises a stop arrangement configured to hold a first end of the pulling wire in place with respect to the holder element, and wherein the holder element encapsulates the stop arrangement, preferably the stop arrangement comprises a ferrule arranged around the pulling wire, wherein the ferrule is clamped onto the pulling wire so as to be firmly attached thereto, and wherein the ferrule, at least over a part of its length, has a diameter that is larger than that of a first aperture, wherein the holder element is provided with the first aperture and second and third apertures, wherein the stop arrangement is arranged inside the holder element at the first aperture, wherein the pulling wire extends out from the holder element via the first aperture and back into the holder element via the second aperture so as to form a loop outside of the holder element between the first and second apertures, wherein the pulling wire extends out from the holder element via the third aperture and further towards the pulling arrangement, and wherein the pulling wire is free to move in relation to the holder element between the second and third apertures so that the loop of the wire is tightened or decreased when pulling the pulling wire out from the third aperture and so that the loop of the pulling wire is loosened or increased when pulling the pulling wire out from the second aperture, wherein the holder element comprises a first and a second portion, wherein the first and second apertures are arranged in the first portion, wherein the third aperture is arranged in the second portion, and wherein the first portion is arranged to interconnect with the second portion so that the first and/or the second portion encapsulate the stop arrangement when connected, wherein the holder element is provided with a wire guiding channel through which the pulling wire runs, wherein the wire guiding channel extends between the second and third apertures, and wherein a part of the wire guiding channel is formed by a guiding tube that is connected to the first portion and extends towards the second portion, and wherein the holder element comprises a magnet, wherein the magnet is provided with a through hole through which the pulling wire runs, and wherein the magnet is arranged at an inside of the second portion facing the first portion of the holder element, wherein the guiding tube is adapted to hold the magnet in place when the first and second portions are interconnected.

2. The patient transfer device according to claim 1, wherein the longitudinal axis of the wire bobbin extends in a substantially horizontal direction and in a direction substantially perpendicular to a general direction of the wire path, wherein the widening portion at the path exit comprises an increasing width of the wire path in a direction along the wire path and towards the path exit.

3. The patient transfer device according to claim 2, wherein the wire bobbin is located at a lower level than the path exit, and wherein the wire path comprises a downwardly directed portion at the path exit so as to allow the pulling wire to be directed at an angle downwards towards the wire bobbin while avoid rubbing the pulling wire against a horizontally directed edge at the path exit when the pulling wire is retracted and wind up around the wire bobbin.

4. The patient transfer device according to claim 1, wherein the wire guide comprises a wheel arranged at the path exit, wherein the wheel is provided with a wire guiding recess that extends circumferentially at an outer side of the wheel and forms part of the wire path, and wherein a width of the wire guiding recess increases with an increasing distance from a center point of the wheel.

5. The patient transfer device according to claim 1, wherein the wire guide comprises a cylindrical element surrounding the wire path along a longitudinal direction thereof.

6. The patient transfer device according to claim 5, wherein the cylindrical element is open at the path entrance towards the holder element and has a funnel-shaped entrance part adapted to a corresponding cone-shaped end part of the holder element so as to receive and enclose the coned-shaped end part of the holder element when the pulling wire is fully retracted.

7. The patient transfer device according to claim 5, wherein the cylindrical element has an elongated opening that extends entirely along the cylindrical element so as to allow removal and replacement of the pulling wire from/to the cylindrical element without having to pass an end of the pulling wire through the cylindrical element, preferably the elongated opening comprises a plurality of sections that extend in different directions.

8. The patient transfer device according to claim 1, wherein the wire guide is arranged on a casing of the pulling arrangement.

9. The patient transfer device according to claim 1, wherein the pulling arrangement is provided with a proximity sensor configured to detect whether the holder element has reached an end position at or close to the pulling arrangement, preferably the patient transfer device is provided with a control circuitry configured to control operation of the motor in dependence of a sensor signal received from the proximity sensor, wherein the control circuitry is configured to stop operation of the motor when receiving a sensor signal that indicates that the holder element has reached the end position.

10. The patient transfer device according to claim 9, wherein the proximity sensor is configured to sense presence or changes in an electromagnetic field or a beam of electromagnetic radiation.

11. The patient transfer device according to claim 9, wherein the proximity sensor is configured to sense presence or changes in a magnetic field, and wherein the holder element is provided with a magnet.

12. The patient transfer device according to claim 9, wherein the proximity sensor is arranged in connection to the wire guide.

13. The patient transfer device according to claim 9, wherein the proximity sensor protrudes through a hole in a casing of the pulling arrangement so as to be positioned at least partly above an upper surface of the casing, preferably the wire guide is arranged on top of and around the proximity sensor, wherein the wire guide on its lower side is provided with a recess configured to give room for and house the protruding part of the proximity sensor.

* * * * *